US009911421B2

(12) United States Patent
Tsujikawa et al.

(10) Patent No.: US 9,911,421 B2
(45) Date of Patent: Mar. 6, 2018

(54) SPEAKER IDENTIFICATION METHOD, SPEAKER IDENTIFICATION APPARATUS, AND INFORMATION MANAGEMENT METHOD

(71) Applicant: Panasonic Intellectual Property Corporation of America, Torrance, CA (US)

(72) Inventors: Misaki Tsujikawa, Shiga (JP); Yutaka Banba, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/419,056

(22) PCT Filed: Jun. 5, 2014

(86) PCT No.: PCT/JP2014/002992
§ 371 (c)(1),
(2) Date: Feb. 2, 2015

(87) PCT Pub. No.: WO2014/199602
PCT Pub. Date: Dec. 18, 2014

(65) Prior Publication Data
US 2015/0194155 A1     Jul. 9, 2015

(30) Foreign Application Priority Data

Jun. 10, 2013    (JP) ................................ 2013-121713
Jun. 10, 2013    (JP) ................................ 2013-121715

(51) Int. Cl.
*G10L 17/00*      (2013.01)
*H04N 21/4415*    (2011.01)
(Continued)

(52) U.S. Cl.
CPC .......... *G10L 17/00* (2013.01); *G06F 17/3074* (2013.01); *H04N 21/42203* (2013.01); *H04N 21/4415* (2013.01); *H04N 21/4532* (2013.01)

(58) Field of Classification Search
CPC ...................................................... G10L 17/22
See application file for complete search history.

(56) References Cited

U.S. PATENT DOCUMENTS 5,897,616 A *   4/1999   Kanevsky ............... G10L 17/24
                                                                      379/88.02
9,262,612 B2 *   2/2016   Cheyer ................... G06F 21/32
(Continued)

FOREIGN PATENT DOCUMENTS

EP         1 292 146       3/2003
JP         11-282492     10/1999
(Continued)

OTHER PUBLICATIONS

International Search Report dated Jul. 1, 2014 in International (PCT) Application No. PCT/JP2014/002992.

*Primary Examiner* — Brian L Albertalli
(74) *Attorney, Agent, or Firm* — Wenderoth, Lind & Ponack, L.L.P.

(57) ABSTRACT

The speaker identification system has a voice acquisition unit that acquires voice information of a speaker, and a database management unit that determines whether or not the speaker corresponding to the acquired voice information matches a speaker corresponding to registered voice information in connection with content information on a content, that acquires content information on the content displayed on a device at the time of acquisition of the voice information and stores the acquired content information in connection with the registered voice information in a case where it is determined that the speaker corresponding to the acquired voice information matches the speaker corresponding to the (Continued)

registered voice information, and that stores the acquired voice information in the database as registered voice information in a case where it is determined that the speaker corresponding to the acquired voice information does not match the speaker corresponding to the registered voice information.

12 Claims, 29 Drawing Sheets

(51) Int. Cl.
*H04N 21/422* (2011.01)
*H04N 21/45* (2011.01)
*G06F 17/30* (2006.01)

(56) References Cited

U.S. PATENT DOCUMENTS

| | | | |
|---|---|---|---|
| 2002/0035477 A1* | 3/2002 | Schroder | G10L 15/26 704/275 |
| 2002/0188455 A1* | 12/2002 | Shioda | G10L 15/26 704/275 |
| 2003/0103088 A1* | 6/2003 | Dresti | G06F 3/0481 715/835 |
| 2004/0193426 A1* | 9/2004 | Maddux | G06Q 30/02 704/275 |
| 2005/0049862 A1* | 3/2005 | Choi | G10L 17/00 704/231 |
| 2006/0080357 A1 | 4/2006 | Sakai et al. | |
| 2007/0280436 A1* | 12/2007 | Rajakumar | G06Q 20/24 379/88.02 |
| 2011/0099596 A1* | 4/2011 | Ure | H04N 7/17318 725/106 |
| 2011/0106536 A1* | 5/2011 | Klappert | G06Q 30/02 704/246 |
| 2011/0106744 A1 | 5/2011 | Becker et al. | |
| 2011/0208524 A1* | 8/2011 | Haughay | G10L 15/22 704/246 |
| 2011/0276331 A1* | 11/2011 | Yamazaki | G10L 15/06 704/246 |
| 2012/0072424 A1* | 3/2012 | Weising | G06F 17/2785 707/740 |
| 2012/0167127 A1 | 6/2012 | Uchida et al. | |
| 2013/0246051 A1* | 9/2013 | Cai | G10L 17/00 704/201 |
| 2014/0088952 A1* | 3/2014 | Fife | G06F 17/27 704/9 |

FOREIGN PATENT DOCUMENTS

| | | |
|---|---|---|
| JP | 2006-99195 | 4/2006 |
| JP | 2006-324809 | 11/2006 |
| JP | 2009-296346 | 12/2009 |
| JP | 2011-223573 | 11/2011 |
| WO | 01/89216 | 11/2001 |
| WO | 2005/069171 | 7/2005 |

* cited by examiner

FIG. 5

| REGISTERED VOICE INFORMATION | VIEWED CONTENT INFORMATION |
|---|---|
| 0001.wav | 2013.05.23.19.25_QUIZ AA_HANAKO<br>2013.05.24.20.00_COMEDY BB_TARO<br>: |
| 0002.wav | 2013.05.23.19.25_QUIZ AA_HANAKO |
| 0003.wav | 2013.05.23.23.05_NEWS CC_JIRO |

FIG. 6

| REGISTERED VOICE INFORMATION | VIEWED CONTENT INFORMATION ||||
| --- | --- | --- | --- |
| | GENRE | CAST MEMBERS | VIEWING TIME ZONES |
| 0001.wav | • VARIETY  X%<br>• DRAMA  Y%<br>⋮ | • aaaa  X%<br>• bbb  Y%<br>⋮ | • MORNING  X%<br>• MIDNIGHT  Y%<br>⋮ |
| 0002.wav | • VARIETY  X%<br>• NEWS  Y%<br>⋮ | • aaaa  X%<br>• ccc  Y%<br>⋮ | • MORNING  X%<br>• MIDNIGHT  Y%<br>⋮ |
| 0003.wav | • NEWS  X%<br>• CARTOON  Y%<br>⋮ | • ccc  X%<br>• dd  Y%<br>⋮ | • MORNING  X%<br>• MIDNIGHT  Y%<br>⋮ |

FIG. 7

| REGISTERED VOICE INFORMATION | VIEWED CONTENT INFORMATION |
|---|---|
| 0001.wav | 2013.05.23.19.25_QUIZ AA_HANAKO<br>2013.05.24.20.00_COMEDY BB_TARO<br>⋮ |
| 0002.wav | 2013.05.23.19.25_QUIZ AA_HANAKO |
| 0003.wav | 2013.05.23.23.05_NEWS CC_JIRO |

FIG. 8

| REGISTERED VOICE INFORMATION | VIEWED CONTENT INFORMATION ||||
| --- | --- | --- | --- |
| | GENRE | CAST MEMBERS | VIEWING TIME ZONES |
| 0001.wav | • VARIETY X%<br>• DRAMA Y%<br>: | • aaaa X%<br>• bbb Y%<br>: | • MORNING X%<br>• MIDNIGHT Y%<br>: |
| 0002.wav | • VARIETY X%<br>• NEWS Y%<br>: | • aaaa X%<br>• ccc Y%<br>: | • MORNING X%<br>• MIDNIGHT Y%<br>: |
| 0003.wav | • NEWS X%<br>• CARTOON Y%<br>: | • ccc X%<br>• dd Y%<br>: | • MORNING X%<br>• MIDNIGHT Y%<br>: |

FIG. 13

| REGISTERED VOICE INFORMATION | VIEWED CONTENT INFORMATION | SERVICE SELECTION HISTORY |
|---|---|---|
| 0001.wav | 2013.05.23.19.25_QUIZ AA_HANAKO<br>2013.05.24.20.00_COMEDY BB_TARO | 2013.05.24.20.00_MOVIE DD_TARO |
| 0002.wav | 2013.05.23.19.25_QUIZ AA_HANAKO | |
| 0003.wav | 2013.05.23.23.05_NEWS CC_JIRO | |

FIG. 14

| CONTENTS | AVAILABLE SERVICE CANDIDATES | |
|---|---|---|
| QUIZ AA | INFORMATION ON RECOMMENDED PROGRAMS<br>• PROGRAM NAME<br>• PROGRAM NAME<br>: | ADVERTISEMENT INFORMATION<br>• ~~~~<br>• ~~~~<br>: |
| NEWS CC | INFORMATION ON RECOMMENDED PROGRAMS<br>• PROGRAM NAME<br>• PROGRAM NAME<br>: | ADVERTISEMENT INFORMATION<br>• ~~~~<br>• ~~~~<br>: |

FIG. 15

| GENRE | AVAILABLE SERVICE CANDIDATES | |
|---|---|---|
| VARIETY | INFORMATION ON RECOMMENDED PROGRAMS<br>• PROGRAM NAME<br>• PROGRAM NAME<br>: | ADVERTISEMENT INFORMATION<br>• ~~~~<br>• ~~~~<br>: |
| NEWS | INFORMATION ON RECOMMENDED PROGRAMS<br>• PROGRAM NAME<br>• PROGRAM NAME<br>: | ADVERTISEMENT INFORMATION<br>• ~~~~<br>• ~~~~<br>: |

FIG. 24

| NICKNAME | AGE | GENDER | VOICE SIGNAL |
|---|---|---|---|
| DAD | 45 | MALE | DAD.wav |
| MOM | 42 | FEMALE | MOM.wav |
| HANAKO | 14 | FEMALE | HANAKO.wav |

SPEAKER IDENTIFICATION METHOD, SPEAKER IDENTIFICATION APPARATUS, AND INFORMATION MANAGEMENT METHOD

TECHNICAL FIELD

The present invention relates to a speaker identification method for identifying a speaker, a speaker identification apparatus, and an information management method.

BACKGROUND ART

A conventional method for identifying a user by voice information has been proposed. Patent Literature 1, for example, discloses a method for estimating the ages and genders of viewers, as well as the relationship between the viewers, based on temperature distribution information and voice information, and selecting viewing content by taking into consideration the adaptation to the place, time zone or the like. In this manner, this method provides viewing contents suitable for the viewers and places.

On the other hand, Patent Literature 2, for example, describes that voice data of a plurality of specific speakers are registered together with speaker identification information for specifying the speakers, and that the similarity between the registered voice data and input voice data is calculated to recognize the voices of the speakers.

Unfortunately, an easier way to identify an individual by voice information has not yet been studied.

CITATION LIST

Patent Literature

Patent Literature 1: Japanese Unexamined Patent Publication No. 2006-99195
Patent Literature 2: Japanese Unexamined Patent Publication H11-282492

SUMMARY OF INVENTION

The present invention was contrived in order to solve the foregoing problem, and an object thereof is to provide a speaker identification method capable of initially registering voice information readily in a database, a speaker identification apparatus, and an information management method.

A speaker identification method according to one aspect of the present invention is a speaker identification method for identifying a speaker in the vicinity of a device displaying a content, the method having the steps of: acquiring voice information of the speaker; determining whether or not the speaker corresponding to the acquired voice information matches a speaker corresponding to registered voice information stored in a database in connection with content information on a content; in a case where it is determined that the speaker corresponding to the acquired voice information matches the speaker corresponding to the registered voice information stored in the database, acquiring content information on the content displayed on the device at the time of acquisition of the voice information, and storing the acquired content information in connection with the registered voice information; and in a case where it is determined that the speaker corresponding to the acquired voice information does not match the speaker corresponding to the registered voice information stored in the database, storing the acquired voice information in the database as registered voice information.

BRIEF DESCRIPTION OF DRAWINGS

FIG. 5 is a diagram showing an example of a data structure of a family database according to Embodiment 1 of the present invention.

FIG. 6 is a diagram showing another example of the data structure of the family database according to Embodiment 1 of the present invention.

FIG. 7 is a diagram showing an example of updated contents of the family database displayed by a speaker identification apparatus.

FIG. 8 is a diagram showing another example of the updated contents of the family database displayed by the speaker identification apparatus.

FIG. 13 is a diagram showing an example of a data structure of a family database according to Embodiment 2 of the present invention.

FIG. 14 is a diagram showing an example of a data structure of a service information database according to Embodiment 2 of the present invention.

FIG. 15 is a diagram showing another example of the data structure of the service information database according to Embodiment 2 of the present invention.

FIG. 24 is a diagram showing an example of a data configuration of a viewer configuration DB.

Figure 1:
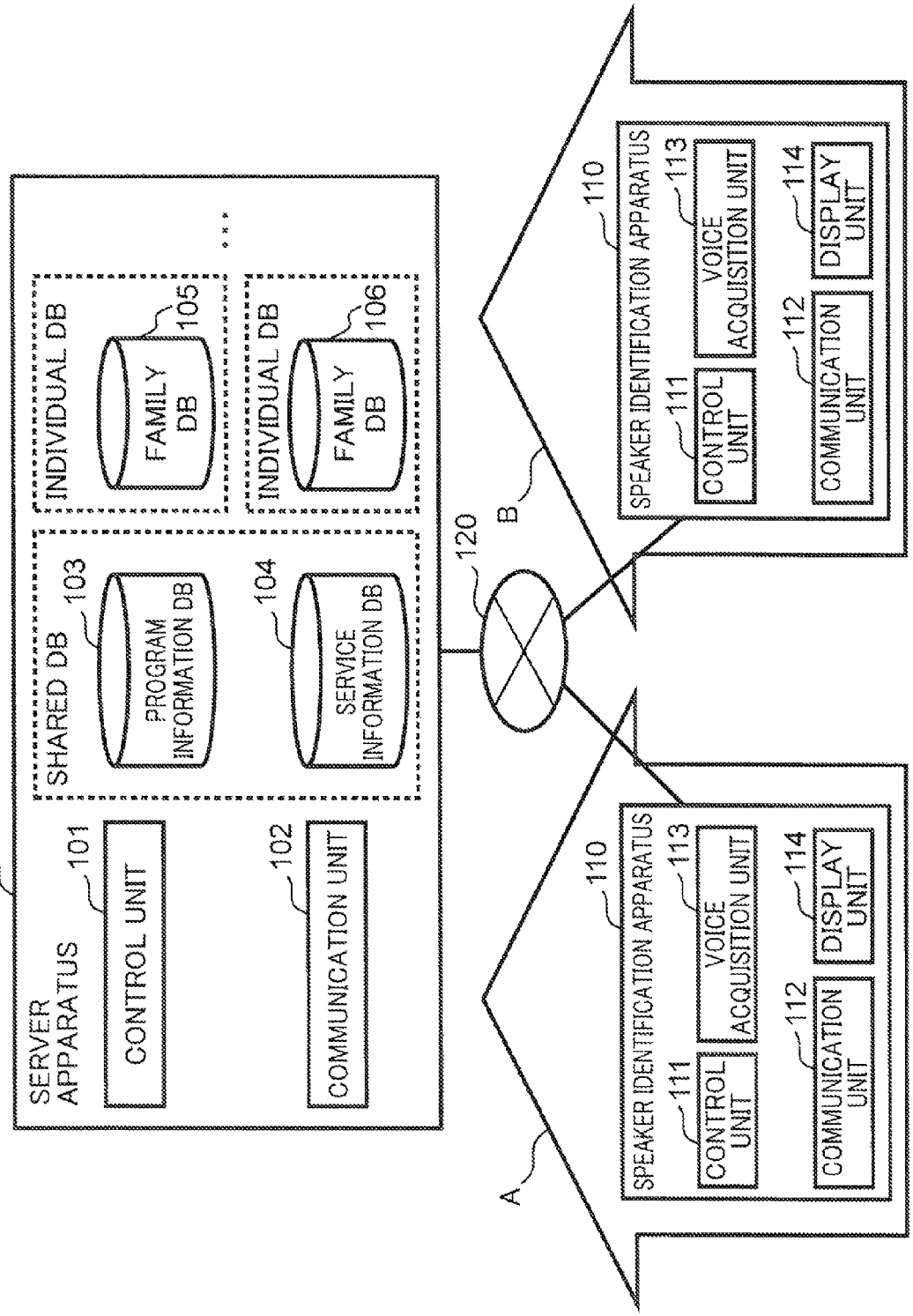
FIG. 1 is a diagram showing the entire configuration of a speaker identification system according to Embodiment 1 of the present invention.

DESCRIPTION OF EMBODIMENTS (The Knowledge Behind the Present Invention)

The viewing content providing system disclosed in Patent Literature 1 estimates the age and gender of a viewer (speaker) based on the temperature distribution information and voice information.

For instance, Patent Literature 1 specifies the age and gender of a viewer (speaker) by checking the temperature of the location where the viewer (speaker) is present, based on the assumption that the body temperature of an adult male is the lowest, the body temperature of a baby the highest, and the body temperature of an adult female between the body temperatures of an adult male and a baby. Therefore, estimating the age through the use of this method merely leads to categorizing the viewer (speaker) into any of three groups: "adult male," "adult female," and "baby." Patent Literature 1 does not disclose a method for specifying in more detail the age and the like of a viewer (speaker).

Patent Literature 1 also discloses a method for estimating the age and gender of a viewer (speaker) by analyzing the spectrum of a voice signal and the speech of the viewer. However, as with the foregoing method using the temperature, this method also merely leads to roughly categorizing the viewer (speaker) into "adult male," "adult female," or "baby."

The viewing content providing system described in Patent Literature 1 can only roughly categorize viewers (speakers), as described above. In other words, even when some viewers (speakers) are categorized as "adult males," for instance, it is difficult to provide each of these viewers (speakers) with a service unique to each of these viewers (speakers), as interests and preferences differ in individuals.

The voice recognition apparatus described in Patent Literature 2, on the other hand, initially registers voice data and speaker recognition information, and then calculates the similarity between the registered voice data and input voice data, to recognize the voice of a user.

By registering voice data and information for identifying a user in advance as described above, Patent Literature 2 might be able to categorize the user into a more specific group instead of categorizing the user into a large group as in Patent Literature 1.

However, this initial registration task is troublesome for the users. Furthermore, constructing the system requires an application for urging the user to execute the initial registration.

The inventors of the present invention, therefore, conceived of the invention according to each of the following aspects.

A speaker identification method according to one aspect of the present invention is a speaker identification method for identifying a speaker in the vicinity of a device displaying a content, the method having the steps of: acquiring voice information of the speaker; determining whether or not the speaker corresponding to the acquired voice information matches a speaker corresponding to registered voice information stored in a database in connection with content information on a content; in a case where it is determined that the speaker corresponding to the acquired voice information matches the speaker corresponding to the registered voice information stored in the database, acquiring content information on the content displayed on the device at the time of acquisition of the voice information, and storing the acquired content information in connection with the registered voice information; and in a case where it is determined that the speaker corresponding to the acquired voice information does not match the speaker corresponding to the registered voice information stored in the database, storing the acquired voice information in the database as registered voice information.

This method enables construction and updating of the database of the speaker without causing the speaker to execute a troublesome setting operation. Moreover, because only the voice information and the content information are managed in connection with each other, only a required database can be constructed without having unnecessary information compiled, resulting in a reduction in the amount of data in the database.

In the foregoing aspect, it is preferred that the content information include a name of the content and a name of a person associated with the content.

In this case, because the name of the content and the name of the person associated with the content are stored in connection with the registered voice information, the content viewed by the speaker can be managed.

In the foregoing aspect, it is preferred that the method further include the step of classifying a plurality of contents associated with the registered voice information into a plurality of genres, calculating, for each of the plurality of genres, a percentage of contents classified into each of the genres from among the plurality of contents, and storing the percentage of contents calculated for each of the plurality of genres in the database in connection with the registered voice information.

In this case, because the percentage of the contents calculated for each of the plurality of genres is stored in connection with the registered voice information, the content of a certain group that the speaker views by choice, can be managed.

Furthermore, in the foregoing aspect, it is preferred that the database store content information in connection with a service to be provided to a speaker who views a content corresponding to the content information, and the method further include the step of, in a case where it is determined that the speaker corresponding to the acquired voice information matches the speaker corresponding to the registered voice information stored in the database, specifying the content information stored in connection with the registered voice information, specifying a service associated with the specified content information, and providing the specified service to the speaker.

In this case, because a service associated with the content information is provided to the speaker, a service suitable for the interests and preferences of the speaker can be provided.

In the foregoing aspect, it is preferred that the method further include the steps of: determining whether at least one available service exists or not and whether or not the at least one available service is provided at a predetermined service providing timing; and in a case where it is determined that the at least one available service exists and that the at least one available service is provided at the predetermined service providing timing, displaying candidates for the at least one available service on the device.

In this case, because candidates for at least one available service is displayed on the device, the speaker can check the available services.

In the foregoing aspect, it is preferred that the method further include the steps of: providing the speaker with a service that is selected by the speaker from among the displayed candidates for the at least one available service; and storing the provided service in the database in connection with the registered voice information.

In this case, the speaker is provided with the service that is selected by the speaker from among the displayed candidates for the at least one service. Therefore, the speaker can select a desired service. Additionally, because the provided service is stored in the database in connection with the registered voice information, the service provided to the speaker can be managed.

In the foregoing aspect, it is preferred that the service include a service for distributing a content to be displayed on the device, or a service for distributing an advertisement to be displayed on the device.

In this case, the service for distributing a content to be displayed on the device or the service for distributing an advertisement to be displayed on the device can be provided to the speaker.

A speaker identification apparatus according to another aspect of the present invention is a speaker identification apparatus for identifying a speaker, having: a display unit that displays a content; a voice acquisition unit that acquires voice information of a speaker in the vicinity of the speaker identification apparatus; a database for storing registered voice information in connection with content information on a content; a determination unit that determines whether or not the speaker corresponding to the voice information acquired by the voice acquisition unit matches a speaker corresponding to the registered voice information stored in the database in connection with the content information; a database update unit that acquires content information on the content displayed on the display unit at the time of acquisition of the voice information and stores the acquired content information in connection with the registered voice information, in a case where the determination unit determines that the speaker corresponding to the acquired voice information matches the speaker corresponding to the registered voice information stored in the database; and a database storage unit that stores the voice information acquired by the voice acquisition unit in the database as registered voice information, in a case where the determination unit determines that the speaker corresponding to the acquired voice information does not match the speaker corresponding to the registered voice information stored in the database.

This apparatus enables construction and updating of the database of the speaker without causing the speaker to execute a troublesome setting operation. Moreover, because only the voice information and the content information are managed in connection with each other, only a required database can be constructed without having unnecessary information compiled, resulting in a reduction in the amount of data in the database.

An information management method according to another aspect of the present invention is an information management method of a speaker identification system for identifying a speaker in the vicinity of a device displaying a content, the method comprising the steps of: receiving voice information of the speaker; determining whether or not the speaker corresponding to the received voice information matches a speaker corresponding to registered voice information stored in a database in connection with content information on a content; in a case where it is determined that the speaker corresponding to the received voice information matches the speaker corresponding to the registered voice information stored in the database, acquiring content information on the content displayed on the device at the time of acquisition of the voice information, and storing the received content information in connection with the registered voice information; and in a case where it is determined that the speaker corresponding to the received voice information does not match the speaker corresponding to the registered voice information stored in the database, storing the received voice information in the database as registered voice information.

This information management method enables construction and updating of the database of the speaker without causing the speaker to execute a troublesome setting operation. Moreover, because only the voice information and the content information are managed in connection with each other, only a required database can be constructed without having unnecessary information compiled, resulting in a reduction in the amount of data in the database.

The embodiments described below each represent a specific example of the present invention. The numerical values, shapes, components, steps, and order of steps described in each of the following embodiments are merely exemplary and are not intended to limit the scope of the present invention. Also, of the components described in each of the following embodiments, those that are not described in the independent claims indicating the most significant concepts of the present invention are provided as the optional components. In addition, the details provided by all the embodiments can be combined.

Embodiment 1

(Configurations of the Apparatuses)

FIG. 1 is a diagram showing the entire configuration of a speaker identification system according to Embodiment 1 of the present invention. The configuration illustrated in FIG. 1 is merely exemplary; thus, the speaker identification system may have a configuration other than the one shown in FIG. 1. The speaker identification system may not have part of the configuration shown in FIG. 1.

The speaker identification system has a server apparatus 100 and a speaker identification apparatus 110. The speaker identification apparatus 110 is a content viewing device such as a television or personal computer installed in a household. As shown in FIG. 1, the server apparatus 100 and the speaker identification apparatus 110 installed in each household are connected by a network 120 in a mutually communicable manner.

One single speaker identification apparatus 110 may be connected to the server apparatus 100, or a plurality of speaker identification apparatuses 110 may be connected to the server apparatus 100. A plurality of speaker identification apparatuses 110 may be disposed in each individual household. The network 120 is, for example, the Internet. Where to place the server apparatus 100 is not particularly limited. The server apparatus 100 may be located in a data center where big data is handled or may be located in each individual household. The data center is held by a company that manages and runs the data center. The configurations of the server apparatus 100 may be placed as a group in a single apparatus or in different apparatuses.

The server apparatus 100 has a control unit 101, a communication unit 102, a program information database (DB) 103, a service information database (DB) 104, and a family database (DB) 105. The program information DB 103 and service information DB 104 are the databases (DB) shared by all the households. The family database (DB) 105 is an individual database (DB) constructed in each household.

The control unit 101 is a component that executes various control operations involving the server apparatus 100, but is not particularly limited. The control unit 101 is configured by, for example, a CPU (Central Processing Unit).

The communication unit 102 is a component for connecting the server apparatus 100 to the network 120, but is not particularly limited. Any methods can be adopted to connect the server apparatus 100 to the network 120.

The program information database 103 and service information database 104 are the shared databases that are referenced by all the speaker identification apparatuses 110. The program information database 103 and service information database 104 are recording units in which a large amount of information can be compiled. The program information database 103 and service information database 104 may be stored in one apparatus altogether or in separate individual apparatuses.

The program information database 103 has, for example, program information on television programs (program names, airtimes, genres, cast members, etc.) compiled therein. Note that the server apparatus 100 may acquire the program information on television programs from an external server apparatus. The television programs are provided through a digital terrestrial broadcasting wave or a satellite broadcasting wave. The contents to be viewed by a user (speaker) may not only be the content of a television program but also be any contents acquired through the Internet. The service information database 104 have information on a service to be provided to the speaker compiled therein.

The family databases 105 and 106 are individual databases constructed in households respectively. The family database 105 is referenced only by the speaker identification apparatus 110 corresponding to each database. As with the shared databases, the family database 105 is a recording unit in which a large amount of information can be compiled. For instance, the family database 105 corresponds to the speaker identification apparatus 110 in a household A shown in FIG. 1, and the family database 106 to the speaker identification apparatus 110 in a household B shown in FIG. 1. These family databases may be stored in one apparatus altogether or in separate individual apparatuses.

The speaker identification apparatuses 110 each have a control unit 111, a communication unit 112, a voice acquisition unit 113, and a display unit 114. Note that these configurations may be incorporated as part of the configuration of the content viewing device or may be incorporated in an apparatus connected to the outside of the content viewing device. These speaker identification apparatuses 110 may each have the configurations mentioned above or may be, for example, a typical household television, a PC (personal computer), a smartphone, a tablet computer, or a cellular phone. Also, the speaker identification apparatuses 110 may each be a specialized apparatus for implementing the speaker identification system.

The control unit 111 and the communication unit 112 are not described herein as they have the same configurations as the control unit 101 and the communication unit 102 of the server apparatus 100.

The voice acquisition unit 113 is a voice recording unit with a microphone. The display unit 114 is a unit with a display function such as a monitor.

Note that FIG. 1 shows a diagram in which the following speaker identification system is configured by the speaker identification apparatus 110 and the server apparatus 100; however, the present invention is not limited to this configuration. For example, part or the entire configuration of the server apparatus 100 may be included in the speaker identification apparatus 110, or the speaker identification system may be configured only by the speaker identification apparatus 110.

(Configuration of the Speaker Identification System)

Figure 2:
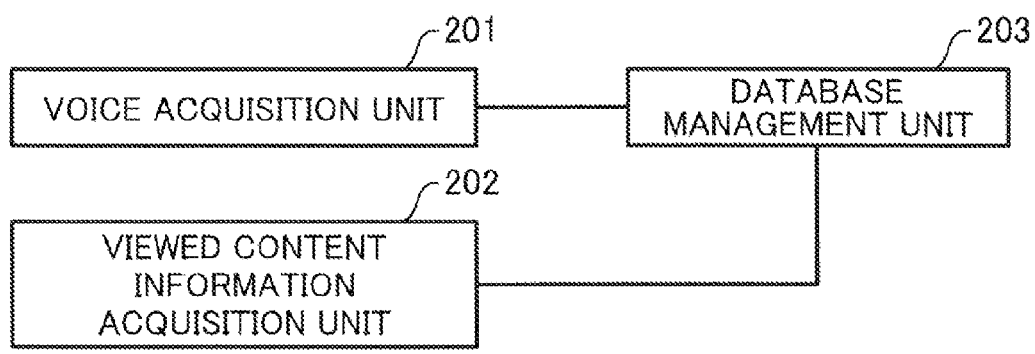
FIG. 2 is a block diagram showing a configuration of the speaker identification system according to Embodiment 1 of the present invention.

FIG. 2 is a block diagram showing a configuration of the speaker identification system according to Embodiment 1 of the present invention.

The speaker identification system according to this Embodiment 1 has a voice acquisition unit 201, a viewed content information acquisition unit 202, and a database management unit 203.

The voice acquisition unit 201 acquires voice information that is so formatted as to be analyzed to identify a speaker. The voice information that is formatted as to be analyzed may be a sound with the voice of one speaker. In a case where the voice information contains a noise besides the voice of a person, the voice acquisition unit 201 may eliminate the noise from the voice information. The timing for acquiring the voice information or the length of time required to acquire the voice information is not particularly limited. The voice acquisition unit 201 may constantly acquire the voice information or may acquire the voice information at predetermined time intervals. The voice acquisition unit 201 may also acquire the voice information only when a person makes a vocal sound. The voice acquisition unit 201 automatically detects a voice interval, analyzes the acquired voice information, and, as a result, outputs the identifiable voice information to the database management unit 203.

The viewed content information acquisition unit 202 acquires viewed content information on a content viewed by a speaker when the voice acquisition unit 201 acquires the voice information. The viewed content information includes, for example, the genres of contents, broadcasting times, cast members, viewing times, and the like. Note that the viewed content information may include other information that can be acquired from a content source or a content viewing device. The viewed content information acquisition unit 202 outputs the acquired viewed content information to the database management unit 203.

The database management unit 203 constructs and manages the family database 105 by using the voice information acquired by the voice acquisition unit 201 and the viewed content information acquired by the viewed content information acquisition unit 202. In the family database 105, registered voice information, which is the voice information acquired in the past, is saved in connection with a history of the viewed content information of each speaker corresponding to the registered voice information. The registered voice information here is registered in the form of a WAV file. The registered voice information, however, does not always have to be a WAV file. For instance, the registered voice information may be MPEG or AIFF audio-compressed data. In addition, the registered voice information is automatically encoded into, for example, a compressed file and then stored in the family database 105.

The database management unit 203 may also compile the viewed content information acquired by the viewed content information acquisition unit 202 directly in the family database 105 or compile a certain amount of the viewed content information acquired by the viewed content information acquisition unit 202 in an internal memory, analyze and classify the compiled viewed content information, and then compile the analyzed and classified viewed content information in the family database 105. The information to be compiled in the family database 105 is described hereinafter.

The database management unit 203 determines whether or not the speaker corresponding to the voice information acquired by the voice acquisition unit 201 matches a speaker corresponding to the registered voice information stored in the family database 105 in connection with the viewed content information. In a case where the database management unit 203 determines that the speaker corresponding to the acquired voice information matches the speaker corresponding to the registered voice information stored in the family database 105, the database management unit 203 acquires viewed content information on a content displayed by the display unit 114 at the time of acquisition of the voice information, and then stores the acquired viewed content information in connection with the registered voice information. In a case where the database management unit 203 determines that the speaker corresponding to the acquired voice information does not match the speaker corresponding to the registered voice information stored in the family database 105, the database management unit 203 stores the voice information acquired by the voice acquisition unit 201 in the family database 105 as registered voice information.

(Operations of the Speaker Identification System)

Figure 3:
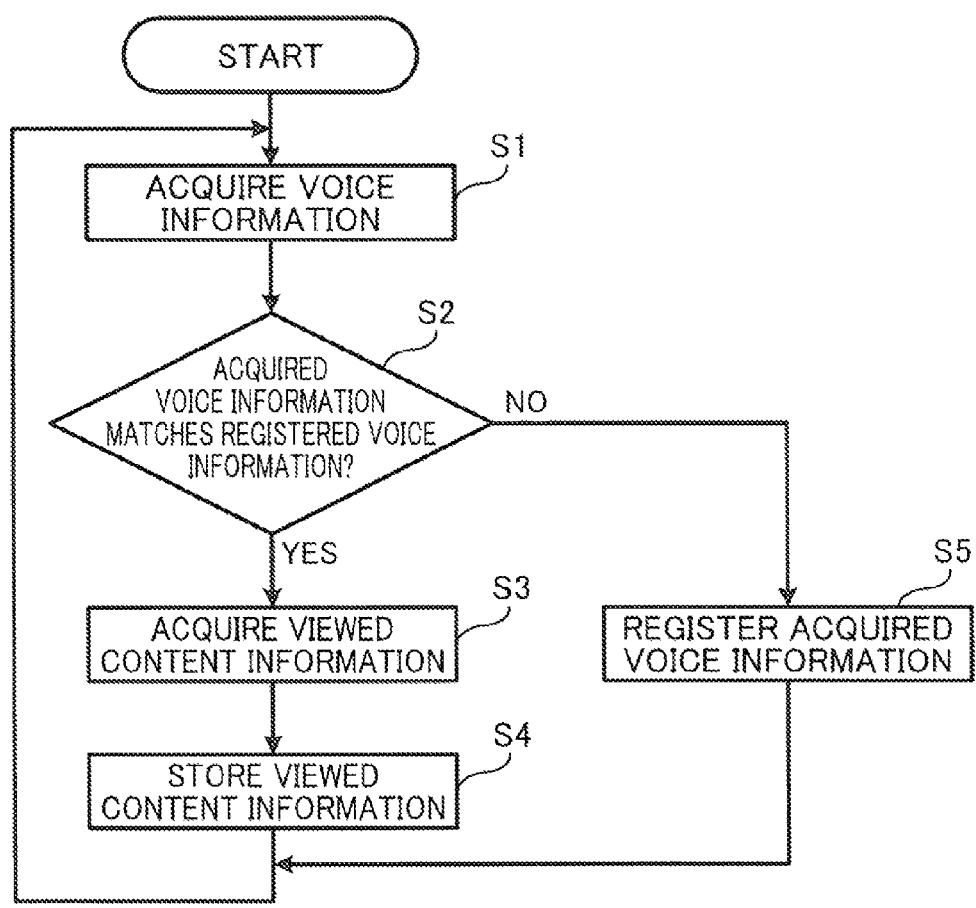
FIG. 3 is a flowchart showing operations of the speaker identification system according to Embodiment 1 of the present invention.

FIG. 3 is a flowchart showing operations of the speaker identification system according to Embodiment 1 of the present invention.

A method for updating the family database by the speaker identification system according to this Embodiment 1 is now described using FIG. 3. Note that the process shown in this flowchart is executed continuously and repeated at the time of acquisition of a voice.

First, the voice acquisition unit 201 acquires voice information of a speaker (step S1).

Next, based on the result of analysis of the acquired voice information (not shown), the database management unit 203 determines whether the acquired voice information matches the registered voice information that was compiled in the family database 105 in the past (step S2). In a case where it is determined that the acquired voice information matches the registered voice information, the process proceeds to step S3. In a case where it is determined that the acquired voice information does not match the registered voice information, the process proceeds to step S5. When this speaker identification system is used for the first time, the process proceeds to step S5 because at that moment the family DB does not exist.

The method for comparing the acquired voice information with the registered voice information is not particularly limited. For instance, the database management unit 203 acquires a speaker model from the acquired voice information and then determines the conformity therebetween by comparing the acquired speaker model with a speaker model corresponding to the registered voice information. A speaker model is information or the like required to identify a speaker and is calculated from the frequency characteristics of the acquired voice information or other characteristics inherent to an individual. The database management unit 203 may create such a speaker model by calculating a normal distribution from the frequency characteristics. Note that the speaker model may be other characteristics that can be acquired from the voice information or other information that can be calculated therefrom, as long as the information can help specify a speaker.

In this manner, by causing the database management unit 203 to determine whether the acquired voice information matches the registered voice information that was compiled in the family database 105 in the past, the database management unit 203 can determine whether or not the speaker corresponding to the acquired voice information matches a speaker corresponding to the registered voice information stored in the family database 105 in connection with the viewed content information.

In a case where it is determined that the acquired voice information matches the registered voice information (YES in step S2), the viewed content information acquisition unit 202 acquires, from the program information database 103, the viewed content information associated with the content that is currently viewed by the speaker using the speaker identification apparatus 110 (step S3).

Next, the database management unit 203 stores the viewed content information acquired by the viewed content information acquisition unit 202, in connection with the registered voice information stored in the family database 105 (step S4). As a result, a family database is reconstructed. Note that the database management unit 203 stores newly acquired viewed content information in addition to the viewed content that is already stored.

However, in a case where it is determined that the acquired voice information does not match the registered voice information (NO in step S2), the database management unit 203 registers (stores) the acquired voice information in the family database 105 as registered voice information (step S5). In so doing, as the registered voice information, the database management unit 203 may store the speaker model created from the acquired voice information.

This process is repeated at regular intervals so that the family database 105 is updated repeatedly, constructing a highly accurate database.

(Sequence Diagram of the Speaker Identification System)

Figure 4:
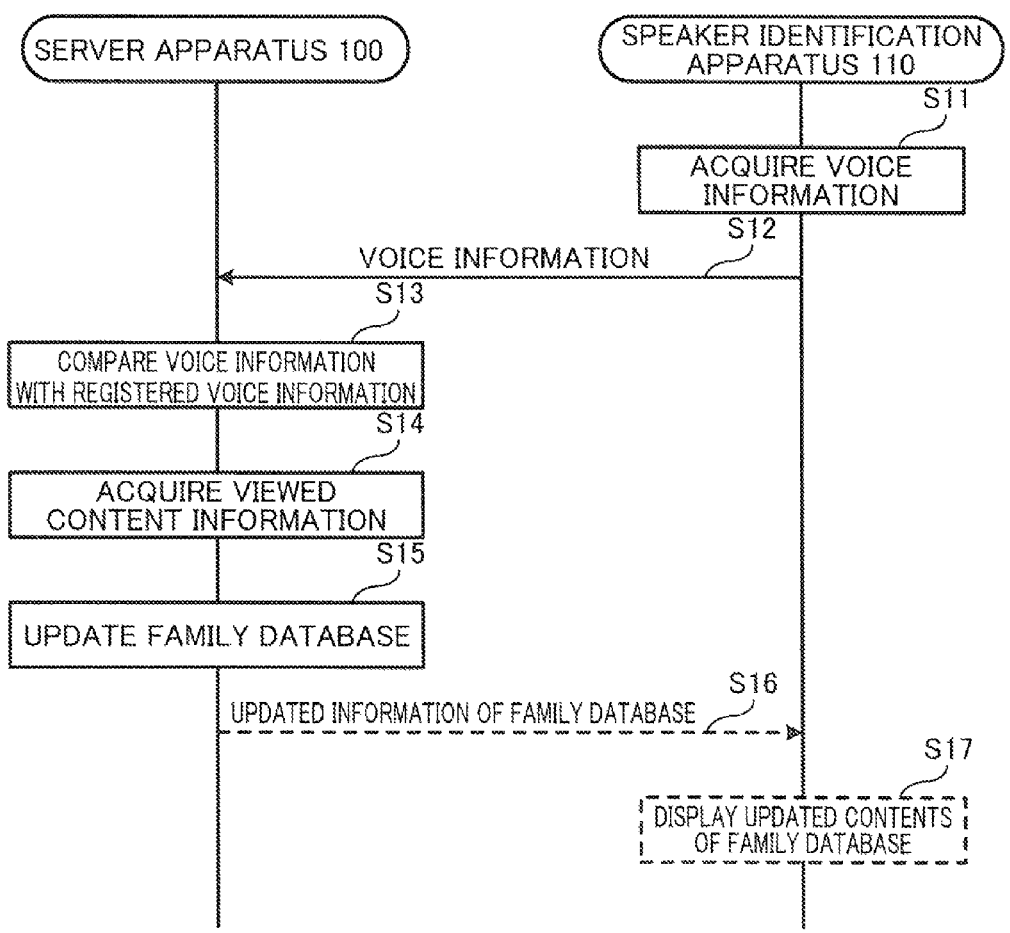
FIG. 4 is a sequence diagram showing an example of the operations of the speaker identification system according to Embodiment 1 of the present invention.

FIG. 4 is a sequence diagram showing an example of the operations of the speaker identification system according to Embodiment 1 of the present invention.

A specific data exchange between the apparatuses and examples of the specific operations of these apparatuses according to this Embodiment 1 are now described using FIG. 4. In the operation example shown in FIG. 4, the speaker identification apparatus 110 is a television. The operation example shown in FIG. 4 is merely exemplary and is not intended to limit the present embodiment.

First of all, in a case where a viewer (speaker) in, for example, the family A shown in FIG. 1 speaks while viewing a content on the speaker identification apparatus 110 (television), the voice acquisition unit 113 of the speaker identification apparatus 110 detects the speech of the viewer (speaker) and acquires voice information of the speaker (step S11).

Next, the control unit 111 analyzes (not shown) the voice information acquired by the voice acquisition unit 113, and the communication unit 112 transmits the voice information analyzed by the control unit 111 to the server apparatus 100 (step S12). Note that the voice may be analyzed by the control unit 111 of the speaker identification apparatus 110 or by the control unit 101 of the server apparatus 100. The communication unit 102 of the server apparatus 100 receives the voice information transmitted by the speaker identification apparatus 110.

Thereafter, the control unit 101 of the server apparatus 100 compares the received voice information with registered voice information in the family database by using the voice information received by the communication unit 102 and the family database 105 of the server apparatus 100 corresponding to the family A (step S13). The control unit 101 determines whether the received voice information matches the registered voice information in the family database. This makes it possible to determine whether or not the speaker whose speech was detected matches the speaker corresponding to the already-registered voice information. The method for determining whether the received voice information matches the registered voice information is the same as the method described in step S2 of FIG. 3; thus, the description thereof is omitted accordingly.

Which family's family database out of the plurality of family databases to be used can be determined by, for example, managing the family databases in relation to device IDs for identifying the speaker identification apparatuses 110 and adding the device IDs to voice information. In other words, the family databases are provided for the respective device IDs for identifying the speaker identification apparatuses 110. The speaker identification apparatuses 110 transmit the device IDs added to the voice information, and the server apparatus 100 reads the family databases corresponding to the received device IDs. The family databases may also be provided for respective viewer IDs for identifying viewers. The speaker identification apparatuses 110 may transmit the viewer IDs added to the voice information, and the server apparatus 100 may read the family databases corresponding to the received viewer IDs. Moreover, the control unit 101 may compare the acquired voice information with all the registered voice information corresponding to the plurality of family databases.

In a case where it is determined that the received voice information matches the registered voice information already registered in the family database, the control unit 101 acquires, from the program information database 103 of the server apparatus 100, the viewed content information associated with the content (program) viewed by the viewer (speaker) of the family A at the time of acquisition of the voice information (step S14).

The method in which the control unit 101 of the server apparatus 100 specifies the program viewed by the viewer (speaker) is not limited. Subsequent to step S13, the control unit 101 may in turn request the speaker identification apparatus 110 to transmit program identification information, such as a channel number, with which the viewed program can be identified. In addition, in step S12, the speaker identification apparatus 110 may transmit the program identification information such as a viewed channel along with the voice information, and the control unit 101 may acquire, from the program information database 103, the viewed content information corresponding to the received program identification information.

Next, the control unit 101 constructs and updates the family database 105 for each viewer (speaker) based on the acquired viewed content information (step S15).

FIG. 5 is a diagram showing an example of a data structure of the family database according to Embodiment 1 of the present invention. For instance, in a case where it is determined that the acquired voice information matches the registered voice information of the family database, the control unit 101 compiles the viewed content information such as the genre, main cast members, and airtime of the content viewed at the time of acquisition of the voice information, in the family database, and then updates the family database, as shown in FIG. 5. In the example shown in FIG. 5, each viewed content information that contains the broadcasting date/time, program name and cast members of a content viewed by a speaker corresponding to the registered voice information, is managed in connection with the corresponding registered voice information compiled in the form of a WAV file. In this manner, in the family database, the registered voice information may be managed in direct connection with the viewed content information on the content viewed by each speaker.

It should be noted that the viewed content information may include the name of the content and the name of a person associated with the content but does not have to include the broadcasting date/time.

FIG. 6 is a diagram showing another example of the data structure of the family database according to Embodiment 1 of the present invention. In the example shown in FIG. 6, the result of analyzing the content viewed in the past by the speaker corresponding to the registered voice information is managed as the viewed content information in connection with each registered voice information compiled in the form of a WAV file. In the example shown in FIG. 6, the control unit 101 calculates and manages the percentages of the genre, cast members and viewing time of a content viewed in the past by the speaker.

The control unit 101 may classify a plurality of contents associated with the registered voice information into a plurality of genres, calculate, for each of the plurality of genres, the percentage of the contents classified into each genre from among the plurality of contents, and store in the family database the calculated percentage of the contents for each of the plurality of genres in connection with the registered voice information.

The control unit 101 may also extract a cast member corresponding to each of the plurality of contents associated with the registered voice information, count the number of times each cast member is extracted, calculate the percentage of the number of times each cast member is extracted, out of the number of all the contents associated with the registered voice information, and store, in the family database and for each of the cast members, the percentage of the number of times each cast member is extracted in connection with the registered voice information.

The control unit 101 may also classify the plurality of contents associated with the registered voice information into a plurality of viewing time zones, calculate the percentage of the contents classified into each viewing time zone, for each of the plurality of viewing time zones, and store in the family database the calculated percentage of the contents for each of the plurality of viewing time zones in connection with the registered voice information. The viewing time zone is classified into four time zones such as morning, daytime, nighttime, and midnight.

If it is difficult to distinguish between the voice information of the family members due to the close similarity therebetween, the control unit 101, for the purpose of improving the accuracy of individually identifying the speakers, may discriminate between the speakers by extracting text information from the voice information of the speakers and analyzing the spoken words of the speakers based on the extracted text information. The control unit 101 may also discriminate between the speakers by comparing the acquired viewed content information with the viewed content information compiled in the family database.

In a case where it is determined that the acquired voice information does not match the registered voice information of the family database, the control unit 101 may compile the acquired voice information in an internal memory without updating the family database at this point. Then, out of the plurality of voice information compiled in the memory, the control unit 101 may create the voice information as new registered voice information and store (register) it in the family database every other week, for example, the voice information being determined as corresponding to the same person.

The process from steps S11 to S15 described above is repeated.

Subsequent to step S15, the communication unit 102 may transmit the updated information of the constructed family database to the speaker identification apparatus 110 (step S16). The communication unit 112 of the speaker identification apparatus 110 receives the updated information of the family database transmitted by the server apparatus 100.

The display unit 114 of the speaker identification apparatus 110 may display the updated contents of the family database based on the received updated information of the family database (step S17). The display unit 114 may display part or all of the updated family database. Note that steps S16 and S17 are not essential.

FIG. 7 is a diagram showing an example of the updated contents of the family database displayed by the speaker identification apparatus. FIG. 8 is a diagram showing another example of the updated contents of the family database displayed by the speaker identification apparatus.

The display screens in FIGS. 7 and 8 each show the family database to which the viewed content information is added, showing the viewed content information of all the users belonging to the same family. Note that the display unit 114 may display only the viewed content information corresponding to a user, to which the viewed content information is added. The display unit 114 may also display the viewed content information as-is, as shown in FIG. 7. The display unit 114 may also display, as the viewed content information, the results of analyzing the contents that were viewed in the past by the speaker corresponding to the registered voice information, as shown in FIG. 8. In the example shown in FIG. 8, the display unit 114 displays the percentages of the genres, cast members and viewing time zones of the contents viewed by the speaker in the past.

The updated contents of the family database may be displayed when the family database 105 (106) is updated or when an instruction regarding displaying the updated contents of the family database is issued by a user. Displaying the updated contents of the family database in this manner allows the users to understand the acquired viewed content information. Furthermore, the users can make sure that the personal information such as the names, ages and genders of the users are not acquired, providing an increased sense of security for the users. In a case where the information compiled in the family database have errors, the speaker identification apparatus 110 can further improve the accuracy of the family database by functioning to correct the wrong information through some kind of an operation.

Figure 9:
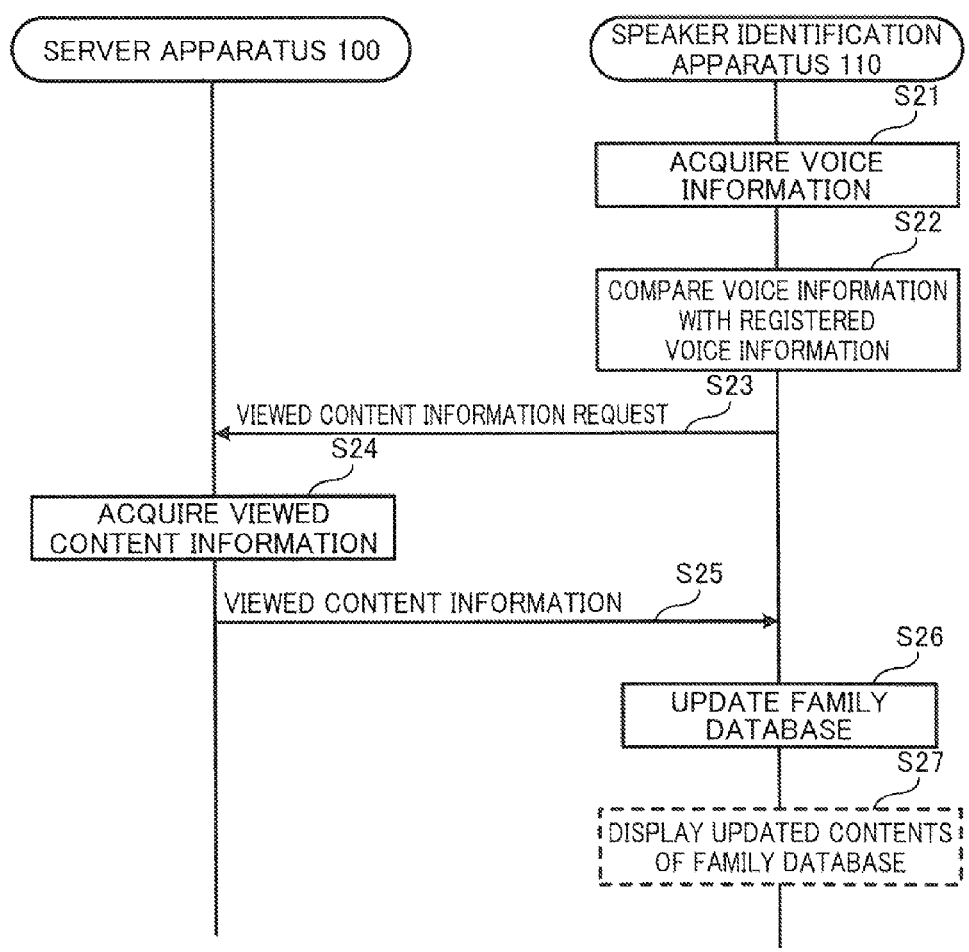
FIG. 9 is a diagram showing another example of the operation of the speaker identification system according to Embodiment 1 of the present invention.

Note that steps S13 and S15 shown in FIG. 4 may be executed by the speaker identification apparatus 110, as shown in FIG. 9. In this case, the speaker identification apparatus 110 may have the family database 105.

FIG. 9 is a sequence diagram showing another example of the operation of the speaker identification system according to Embodiment 1 of the present invention.

First, the voice acquisition unit 113 of the speaker identification apparatus 110 detects a speech of a speaker and acquires voice information of the speaker (step S21). Note that step S21 is the same as step S11 of FIG. 4.

Next, the control unit 111 uses the voice information acquired by the voice acquisition unit 113 and the family database 105 of the speaker identification apparatus 110 corresponding to the family A, to compare the acquired voice information with registered voice information in the family database (step S22). Note that step S22 is the same as step S13 shown in FIG. 4.

Thereafter, the communication unit 112 requests the server apparatus 100 for the viewed content information (step S23).

Subsequently, the control unit 101 of the server apparatus 100 acquires, from the program information database 103 of the server apparatus 100, the viewed content information on a content (program) viewed by the viewer (speaker) of the family A at the time of acquisition of the voice information (step S24). Note that step S24 is the same as step S14 shown in FIG. 4.

Next, the communication unit 102 transmits the acquired viewed content information to the speaker identification apparatus 110 (step S25). The communication unit 112 of the speaker identification apparatus 110 receives the viewed content information transmitted by the server apparatus 100.

Subsequently, the control unit 111 constructs and updates the family database 105 for each viewer (speaker) based on the received viewed content information (step S26). Note that step S26 is the same as step S15 shown in FIG. 4.

Next, the display unit 114 of the speaker identification apparatus 110 may display the updated contents of the family database (step S27). Note that step S27 is the same as step S17 shown in FIG. 4.

According to the present embodiment, the family databases can be constructed and updated without causing the users to execute troublesome setting operations, as described above. Moreover, because only the voice information and the viewed content information are managed in connection with each other, only a necessary database can be constructed without having unnecessary information compiled, reducing the amount of data in the database. For example, as long as the database shown in FIG. 5 or 6 can be constructed, optimum contents can be provided or recommended to the users viewing contents without acquiring unnecessary information such as the ages and genders of the users. Because the personal information such as names, ages and genders of the users are not acquired, the users can feel secure about using the speaker identification system.

As described above, in a case where it is determined through the operations of the speaker identification system shown in FIG. 3 that the acquired voice information does not match the registered voice information of the family database (NO in step S2), the database management unit 203 registers the acquired voice information in the family database; however, the present invention is not particularly limited to this configuration. For instance, the database management unit 203 may acquire the voice information of a speaker continuously during a certain period of time (period), count the number of times the acquired voice information is determined in step S2 as not matching the registered voice information of the family database, and then execute step S5 only when the counted number of times exceeds a predetermined number. This can prevent the increase in the amount of data in the family database, which do not need to be acquired originally, as well as the increase in the amount of noise.

Furthermore, in the present embodiment, in a case where the voice information matching the registered voice information is not acquired for a certain period of time or longer, the control unit 101 may delete the registered voice information from the family database. As a result, even when voice information of a person other than the family members is registered in the family database, such voice information can be deleted automatically.

The system of the present embodiment that only uses the voice information for personal identification can avoid acquisition of excess personal information of a user. For example, in a case where an image of a user is acquired with an imaging device such as a camera, the information required for personal identification such as information on the face of the user can be acquired, as well as the personal information not required for personal identification, such as the clothes the user is wearing and the conditions of the room where the user is present. The present embodiment, however, is configured to be able to prevent the increase in the amount of data that do not need to be acquired originally, as well as the increase in the amount of noise, so long as only the voice information for personal identification are used. Not acquiring the unnecessary personal information of a user can reduce the user's uncomfortable feeling.

Embodiment 2

(Configurations of the Speaker Identification System)

Figure 10:
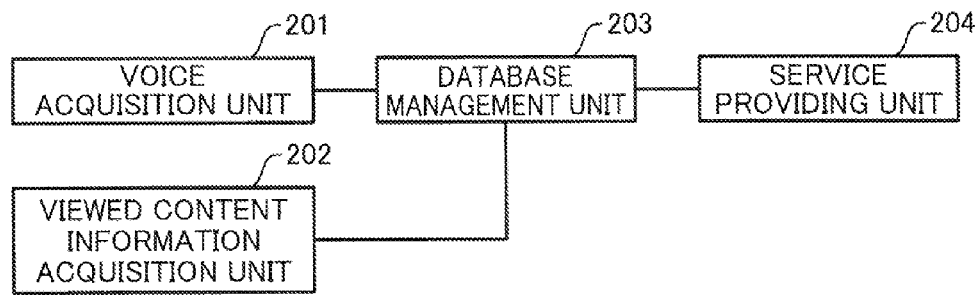
FIG. 10 is a block diagram showing a configuration of a speaker identification system according to Embodiment 2 of the present invention.

FIG. 10 is a block diagram showing a configuration of a speaker identification system according to Embodiment 2 of the present invention.

The speaker identification system according to Embodiment 2 has a voice acquisition unit 201, a viewed content information acquisition unit 202, a database management unit 203, and a service providing unit 204.

Note in FIG. 10 that the same reference numerals are used on the components same as those of the speaker identification system shown in FIG. 2; thus, the descriptions thereof are omitted accordingly. The configurations of the voice acquisition unit 201 and viewed content information acquisition unit 202 are the same as those of Embodiment 1; thus, the descriptions thereof are omitted accordingly.

As in Embodiment 1, the database management unit 203 constructs a family database based on the acquired voice information and viewed content information. In Embodiment 2, the database management unit 203 also outputs the voice information and viewed content information stored in the family database to the service providing unit 204. The database management unit 203 then acquires, from the service providing unit 204 described hereinafter, information on a service provided to a user, and then stores the information in connection with registered voice information. The database management unit 203 may also manage a database in which information on candidates for a service to be provided are stored in connection with contents on a television.

The service providing unit 204 provides a service appropriate to the preferences of a viewer (speaker) based on the acquired voice information and viewed content information, in a case where a predetermined service provision condition is satisfied. The "service" here means a service that recommends such contents as available television programs, or a service for distributing advertisements. Note that the service providing unit 204 may provide other services that can be guessed from the viewed content information. The services are provided to the display unit 114 when available. When the services are provided, a plurality of available service candidates are presented to the viewer (speaker) to select. The service candidates to be provided may be acquired from the database managed by the database management unit 203.

A service database (not shown) is for storing the viewed content information in connection with a service to be provided to a speaker viewing the content corresponding to the viewed content information. Note that examples of the viewed content information stored in the service database include the names of the contents.

In a case where it is determined that the speaker corresponding to the acquired voice information matches the speaker corresponding to the registered voice information stored in the family database, the service providing unit 204 specifies the content information stored in connection with the registered voice information, specifies a service associated with the specified content information, and provides the specified service to the speaker.

The service providing unit 204 also determines whether there exists at least one service available and determines whether or not the time the at least one service is provided at a predetermined service providing timing. In a case where it is determined that at least one available service exists and that the at least one service is provided at the predetermined service providing timing, the service providing unit 204 causes the speaker identification apparatus 110 to display candidates for the at least one available service.

The service providing unit 204 also provides the speaker with a service that is selected by the speaker from the displayed candidates for the at least one service. The database management unit 203 stores the provided service in the family database in connection with the registered voice information.

The service also includes a service for distributing a content to be displayed by the speaker identification apparatus 110, or a service for distributing an advertisement to be displayed by the speaker identification apparatus 110.

(Operations of the Speaker Identification System)

Figure 11:
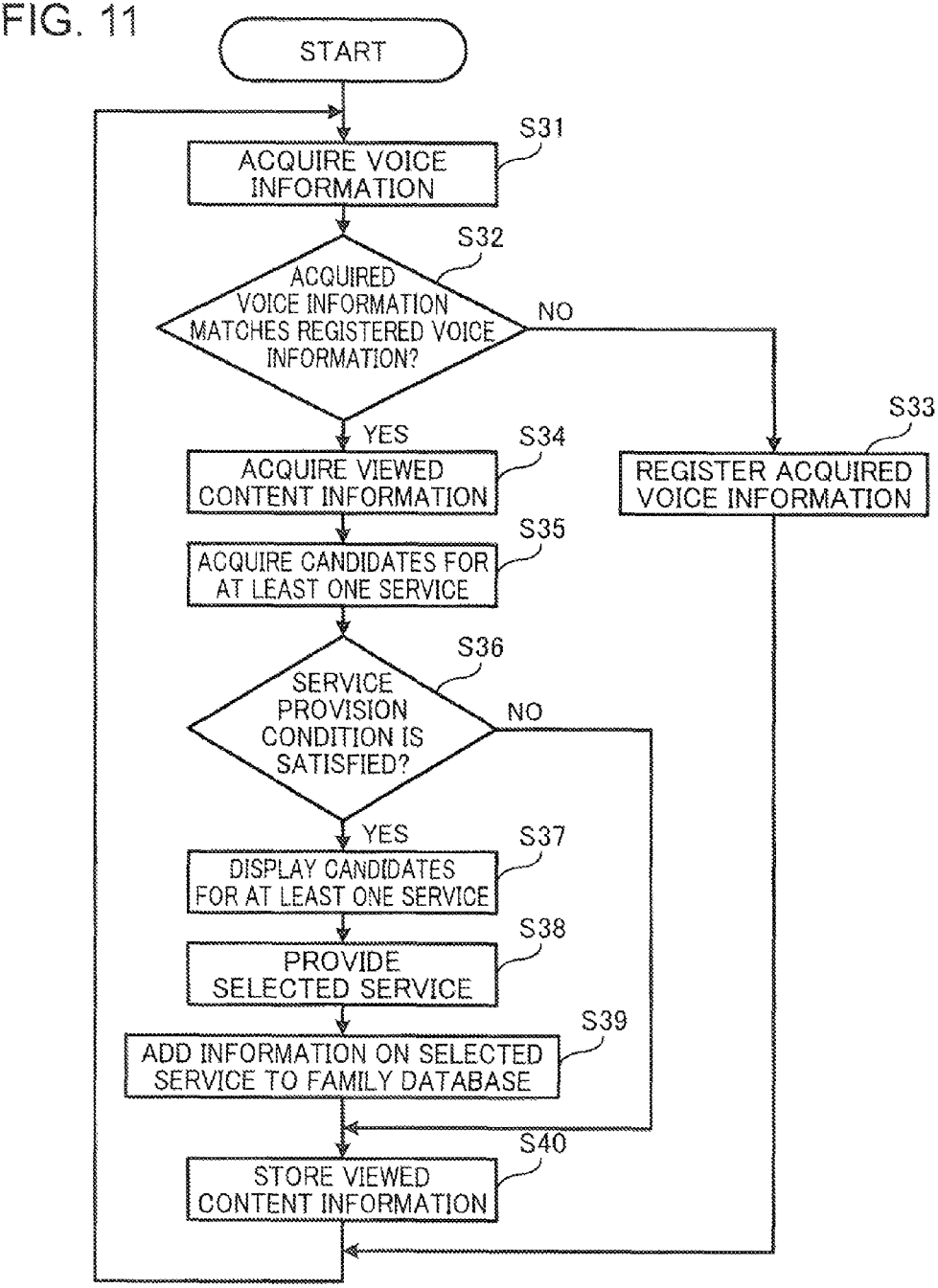
FIG. 11 is a flowchart showing operations of the speaker identification system according to Embodiment 2 of the present invention.

FIG. 11 is a flowchart showing operations of the speaker identification system according to Embodiment 2 of the present invention.

A method for providing a service by the speaker identification system according to Embodiment 2 is now described using FIG. 11. Note that the process shown in this flowchart is executed continuously and repeated at the time of acquisition of a voice.

In addition, in the operations of the speaker identification system according to Embodiment 2 shown in FIG. 11, the descriptions of the steps that are the same as those executed by the speaker identification system according to Embodiment 1 shown in FIG. 3 are omitted.

Steps S31 and S32 shown in FIG. 11 are the same as steps S1 and S2 shown in FIG. 3; thus, the descriptions thereof are omitted accordingly. Also, step S33 for registering the acquired voice information in the family database when it is determined in step S32 that the acquired voice information does not match the registered voice information, is the same as step S5 shown in FIG. 3; thus, the description thereof is omitted accordingly.

In a case where it is determined that the acquired voice information matches the registered voice information in the family database (YES in step S32), the viewed content information acquisition unit 202 acquires, from the program information database 103, the viewed content information on a content that is currently viewed by the speaker using the speaker identification apparatus 110 (step S34). Note that step S34 is the same as step S3 shown in FIG. 3.

Next, the service providing unit 204 acquires candidates for at least one service to be provided from the database management unit 203 (step S35). The candidates for at least one service to be provided include, for example, at least one service that is associated with the viewed content information corresponding to the registered voice information matching the acquired voice information. In other words, because the acquired candidates for at least one service are associated with the viewed content information at this moment, the candidates are narrowed down to the services appropriate to the preferences of the viewer (speaker).

The service providing unit 204 then determines whether the service provision condition is satisfied or not (step S36). In a case where it is determined that the service provision condition is satisfied, the process proceeds to step S34. In a case where it is determined that the service provision condition is not satisfied, the process proceeds to step S40. The service provision condition includes determining whether an available service exists or not and determining whether or not the available service is provided at the predetermined service providing timing. Determining whether an available service exists or not means determining in step S35 whether the candidates for at least one service are acquired or not. For instance, there is a possibility that the candidates for a service are not associated depending on the viewed content. In this case, the process proceeds to step S40. Determining whether or not the available service is provided at the service providing timing is, for example, to determine whether the available service is provided at a timing when the provision of the service does not interfere with the viewing of a content, such as when the power of the speaker identification apparatus 110 is turned ON or when the content viewed by the speaker is changed. When the service providing timing interferes with the viewing of a content, the process proceeds to step S40. Note that the service providing timing may be selected intentionally by the viewer (speaker) or determined automatically by the speaker identification system.

In a case where it is determined that the service provision condition is satisfied (YES in step S36), the service providing unit 204 displays the candidates for at least one service on the display unit 114 in a selectable manner (step S37). The method for displaying the candidates may, for example, display the candidates so as not to interfere with the viewing of a currently viewed content, or change the currently displayed content to display the candidates. Note that the examples of displaying the candidates for services are described hereinafter.

Next, in a case where one of the at least one service candidates displayed is selected, the service providing unit 204 provides the selected service (step S38). In a case where any of the at least one service candidates displayed is not selected, the process may proceed to step S40.

Next, the database management unit 203 adds the information on the selected service to the family database in connection with the registered voice information (step S39).

The database management unit 203 then stores the viewed content information acquired by the viewed content information acquisition unit 202, in connection with the registered voice information stored in the family database (step S40). As a result, the family database is reconstructed. Note that step S40 is the same as step S4 shown in FIG. 3.

(Sequence Diagram of the Speaker Identification System)

Figure 12:
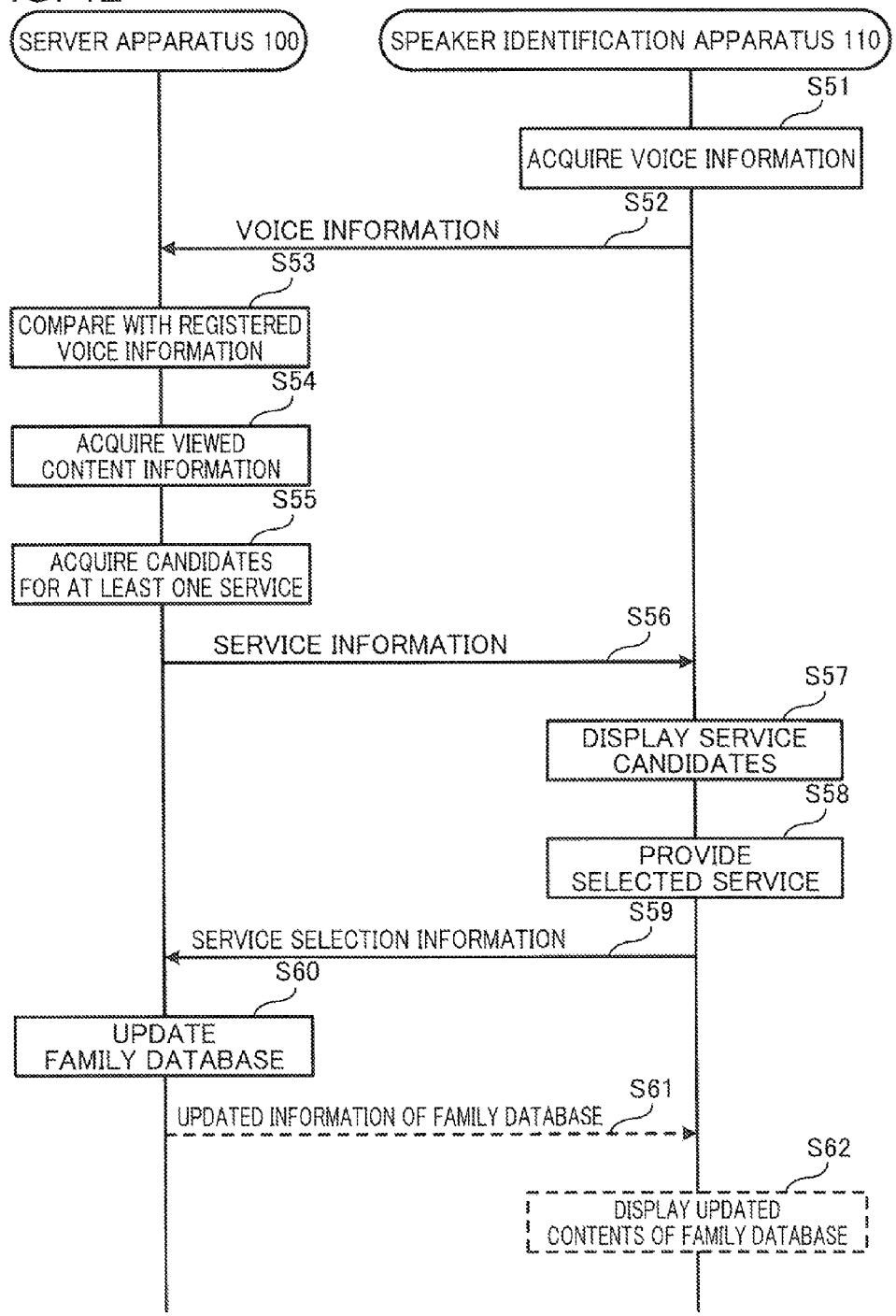
FIG. 12 is a sequence diagram showing an example of the operations of the speaker identification system according to Embodiment 2 of the present invention.

FIG. 12 is a sequence diagram showing an example of the operations of the speaker identification system according to Embodiment 2 of the present invention.

A specific data exchange between the apparatuses and examples of the specific operations of these apparatuses according to this Embodiment 2 are now described using FIG. 12. In the operation example shown in FIG. 12, the speaker identification apparatus 110 is a television. The operation example shown in FIG. 12 is merely exemplary and is not intended to limit the present embodiment.

In addition, in the operations of the speaker identification system according to Embodiment 2 shown in FIG. 12, the descriptions of the steps that are the same as those executed by the speaker identification system according to Embodiment 1 shown in FIG. 4 are omitted. Steps S51 to S54 shown in FIG. 12 are the same as steps S11 to S14 shown in FIG. 4; thus, the descriptions thereof are omitted accordingly. The following describes a case where the voice information of the viewers (speakers) of, for example, the family A shown in FIG. 1 are compared with the registered voice information of the family database 105 and whereby it is determined that the registered voice information match the voice information of the existing speakers stored in the family database 105.

The control unit 101 of the server apparatus 100 acquires candidates for at least one service to be provided, from the service information database 104 based on the viewed content information of the family database 105 (step S55). The method for acquiring candidates for a service to be provided is now described using FIGS. 13 to 15.

FIG. 13 is a diagram showing an example of a data structure of the family database according to Embodiment 2 of the present invention. As shown in FIG. 13, in the family database 105 according to Embodiment 2, the viewed content information and a history of the services selected by the speakers in the past (service selection history) are compiled with respect to the registered voice information.

FIG. 14 is a diagram showing an example of a data structure of the service information database according to Embodiment 2 of the present invention. As shown in FIG. 14, in the service information database 104 according to this Embodiment 2, candidates for the services to be provided (available service candidates) are compiled in connection with the names of contents. It should be noted here that a single content name is not necessarily associated with a single service candidate but may be associated with a plurality of service candidates.

Suppose that there is registered voice information "0001.wav" that is determined in step S53 as matching the voice information. In this case, the control unit 101 compares the content name that is included in the viewed content information associated with the registered voice information "0001.wav" with the content names stored in the service information database 104. Out of the content names stored in the service information database 104, the control unit 101 searches for a content name that matches the content name that is included in the viewed content information associated with the registered voice information "0001.way." Then, for example, in a case where the content name matches "Quiz AA," as shown in FIG. 14, the control unit 101 acquires, from the service information database 104, the candidates for the available services corresponding to this matching content name. As a result, a candidate for a service associated with the content of the speaker's interest (providing the content or advertisement) can be selected.

The method for acquiring service candidates is not limited to the one described above. For instance, in place of the content names, the cast members may be managed in connection with the available service candidates, so that a candidate for a service associated with the cast member(s) of the speaker's interest (providing the content or advertisement) can be selected.

FIG. 15 is a diagram showing another example of the data structure of the service information database according to Embodiment 2 of the present invention. As shown in FIG. 15, in the service information database 104 of another example according to Embodiment 2, candidates for services to be provided (available service candidates) are compiled in connection with the genres of contents.

In this case, the control unit 101 specifies the genre of the content that was viewed the most in the past, by using the viewed content information associated with the registered voice information determined to be identical with the acquired voice information, and searches the genres stored in the service information database 104 for a genre that matches the specified genre. When a matching genre exists, the control unit 101 acquires the available service candidates corresponding to the matching genre from the service information database 104. As a result, a candidate for the service associated with the genre of the content of the speaker's interest (providing the content or advertisement) can be selected.

Even in a case where the voice information cannot be acquired, the available service candidates stored in the service information database 104 may be updated so long as there exist the information on the service that can be provided based on the viewed content information of the family database 105.

Returning to FIG. 12, the communication unit 102 of the server apparatus 100 transmits the service information indicating the acquired at least one service candidate to the television, the speaker identification apparatus 110 (step S56). The communication unit 112 of the speaker identification apparatus 110 receives the service information transmitted by the server apparatus 100.

Next, the control unit 111 of the speaker identification apparatus 110 determines whether or not the at least one service is provided at the predetermined service providing timing. In a case where it is determined that the at least one service is provide at the service providing timing, the display unit 114 of the speaker identification apparatus 110 displays the candidates for the service (step S57). The display unit 114 displays the service candidates at the most appropriate timing when, for example, the viewer (speaker) doe not pay attention to the currently viewed content, selects a service, or changes the viewed content, such as immediately after the power of the television is turned on, when a program guide is displayed, or immediately after some sort of an operation is executed on the television. Also, the control unit 101 of the server apparatus 100 may determine whether the at least one service is provided at the service providing timing, or the control unit 111 of the speaker identification apparatus 110 may make such determination. An input receiving unit (not shown) of the speaker identification apparatus 110 receives selection of one service selected by the viewer (speaker) from among the displayed candidates for the at least one service.

Figure 16:
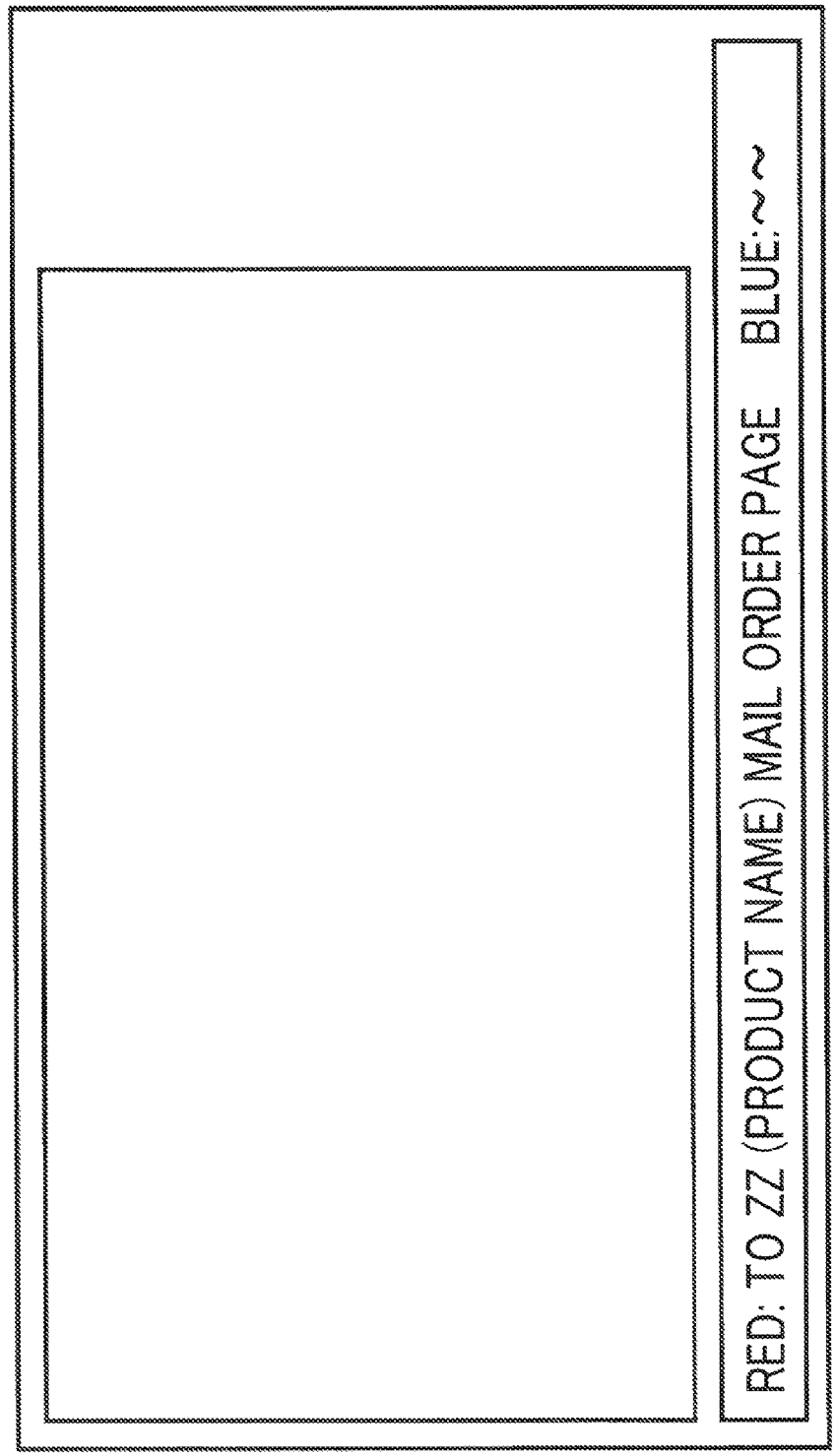
FIG. 16 is a diagram showing an example of a selection screen for selecting a service candidate according to Embodiment 2 of the present invention.

FIG. 16 is a diagram showing an example of a selection screen for selecting a service candidate according to Embodiment 2 of the present invention. For example, as shown in FIG. 16, the display unit 114 displays the candidates for an acquired available service (distribution of an advertisement). FIG. 16 shows an example in which a plurality of advertisements are displayed in connection with the colors of the buttons on a remote. A viewer (speaker) can select a desired service (distribution of an advertisement) by pressing the button on the remote corresponding to the desired service (distribution of an advertisement). The viewer (speaker) may be able to execute a desired operation (changing the channel, shopping on the Internet, etc.) by selecting a service from a service display section. The viewer (speaker) viewing a service may voluntarily execute these operations.

Figure 17:
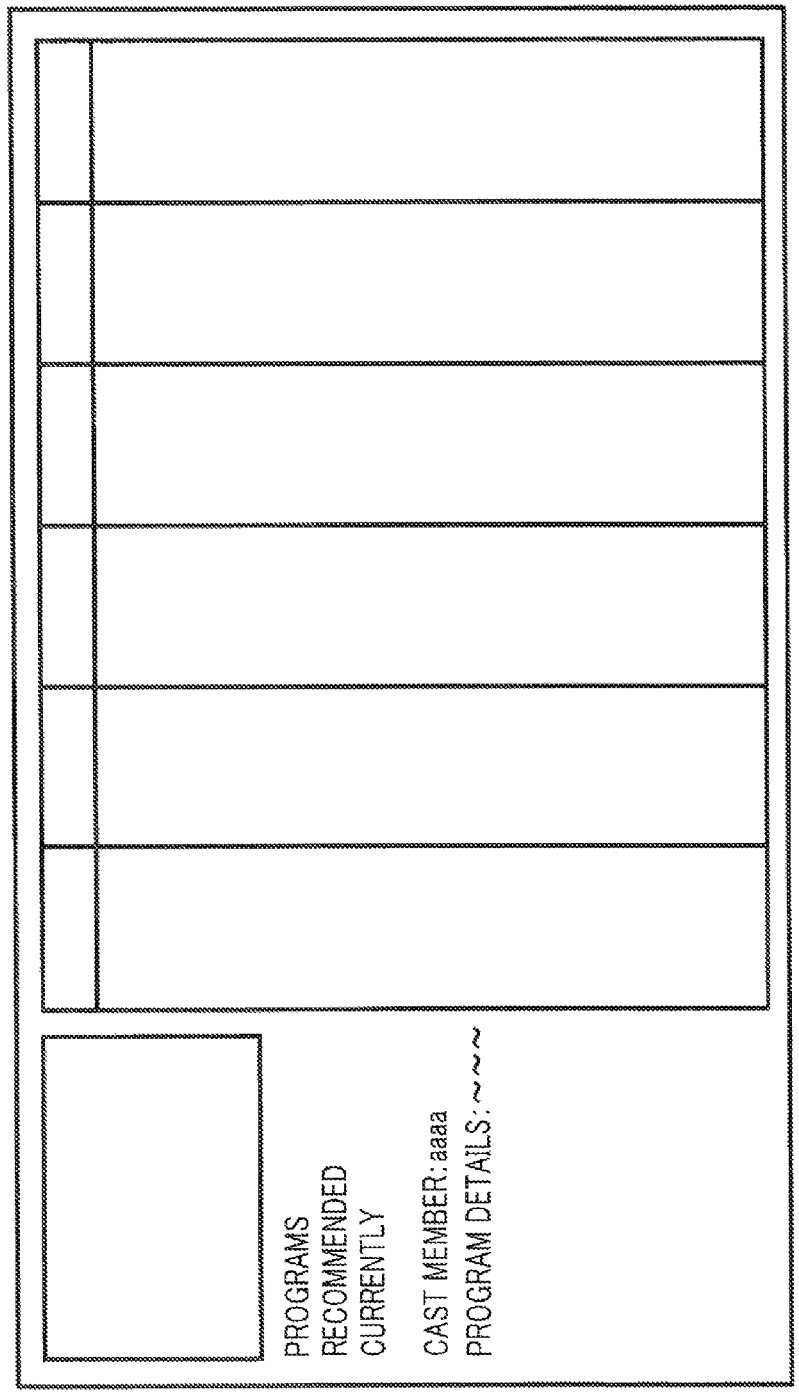
FIG. 17 is a diagram showing another example of the selection screen for selecting a service candidate according to Embodiment 2 of the present invention.

FIG. 17 is a diagram showing another example of the selection screen for selecting a service candidate according to Embodiment 2 of the present invention. For example, as shown in FIG. 17, the display unit 114 displays candidates for an acquired available service (playing a content). FIG. 17 shows an example in which a content (program) recommended to the viewer (speaker) is displayed. The viewer (speaker) can select a desired service (playing a content) by pressing the button on the remote corresponding to the desired service (playing a content).

Next, the control unit 111 of the speaker identification apparatus 110 provides the selected service (step S58). In other words, the control unit 111 causes the display unit 114 to display the selected service. For instance, when the selected service is a content for playing a program content, the control unit 111 plays the selected content. When the content to be played is stored in the speaker identification apparatus 110, the control unit 111 reads and plays the stored content. When the content to be played is not stored in the speaker identification apparatus 110 but stored in the server apparatus 100, the control unit 111 acquires the content from the server apparatus 100 and plays the acquired content. When the selected service is a service for distributing an advertisement, the control unit 111 displays a webpage for the selected advertisement through the network.

Next, in a case where the control unit 111 of the speaker identification apparatus 110 detects selection of a service, the communication unit 112 transmits service selection information on the selected service to the server apparatus 100 (step S59). In a case where the service for playing a content is selected, the service selection information contains, for example, the date/time when the content is played, the name of the played content, and the cast member(s) in the played content. The communication unit 102 of the server apparatus 100 receives the service selection information transmitted by the speaker identification apparatus 110.

Next, the control unit 101 of the server apparatus 100 updates the family database 105 based on the acquired viewed content information and the received service selection information (step S60). In the present embodiment, the control unit 101 updates not only the viewed content information in connection with the registered voice information but also the service selection information selected by the viewer (speaker). As shown in FIG. 13, the control unit 101 updates the service selection history in connection with the registered voice information.

Note that the communication unit 102 may transmit the updated information of the constructed family database to the speaker identification apparatus 110 after step S60 (step S61). The communication unit 112 of the speaker identification apparatus 110 receives the updated information of the family database transmitted by the server apparatus 100.

Furthermore, the display unit 114 of the speaker identification apparatus 110 may display the updated contents of the family database based on the received updated information of the family database (step S62). The display unit 114 may display part or all of the updated family database. Note that steps S61 and S62 are not essential.

In Embodiment 2, therefore, the family database can be constructed without causing a user to execute a troublesome setting operation. By causing a speaker to select an optimum service from among the candidates for the at least one service, the information on a preference of the speaker corresponding to the registered voice information can further be compiled, resulting in providing the speaker a more optimum service.

Embodiment 3

There has been proposed a conventional method for acquiring data that characterizes a viewer in front of a display apparatus such as a television and distributing an optimum advertisement to the viewer (e.g., see WO 01/089216, for example).

However, according to the invention described in WO 01/089216, the pre-registered data characterizing each viewer cannot be used when the family structure of each viewer changes. In addition, the means for registering a new viewer in the database is not evaluated enough.

WO 01/089216 discloses an advertisement distribution method and an advertisement distribution apparatus for transmitting advertisement data to a receiver of each registered viewer. The conventional advertisement distribution apparatus, on the transmission side, receives data characterizing a viewer class from each registered viewer, receives data characterizing a viewer class, which is the subject of advertisement data, and associates the data with the advertisement data. The advertisement distribution apparatus further selects the advertisement data to be transmitted to the receiver of each viewer, from the advertisement data and based on the level of conformity between the data characterizing the viewer class of the viewer and the data characterizing the viewer class which is the subject of the advertisement, and allocates the selected advertisement data to each viewer, for each registered viewer. Then, for each registered viewer, the advertisement distribution apparatus transmits the advertisement data allocated to each viewer, to the receiver of each viewer.

The method described in WO 01/089216 controls the advertisement data distribution based on the level of conformity between the data characterizing the viewer class, which is the subject of the advertisement, and the data characterizing only a registered viewer. Therefore, in a case where the family structure of each viewer changes or there are changes in the registered contents, the procedure for the changes to the registered contents needs to be executed voluntarily. In a case where registration of the data characterizing the viewer class of each viewer fails to be executed, the level of conformity between such data and the data characterizing the viewer class, which is the target of the advertisement, cannot be determined, and consequently each viewer cannot receive an appropriate advertisement, which is a problem of this method.

Based on the foregoing studies, the inventors of the present invention, therefore, conceived of the invention according to each of the following aspects.

A speaker identification method according to one aspect of the present invention is a speaker identification method for identifying a speaker, having the steps of: acquiring voice information of the speaker; determining whether or not the speaker corresponding to the acquired voice information matches a speaker corresponding to registered voice information stored in a database in connection with speaker information on a speaker; in a case where it is determined that the speaker corresponding to the acquired voice information does not match the speaker corresponding to the registered voice information stored in the database, receiving an input of the speaker information of the speaker; and storing the acquired voice information in the database as registered voice information and storing the received speaker information in the database in connection with the registered voice information.

In a case where the voice information of a speaker is acquired to identify the speaker and a new speaker who is not registered in the database is identified, the method according to this aspect prompts registration of the speaker information associated with the new speaker in the database, to register the input speaker information in the database. Therefore, without causing the speaker to execute a troublesome setting operation, the new speaker can be registered in the database.

It is preferred that the foregoing aspect further include the step of distributing a content corresponding to the speaker information. By distributing a content corresponding to the speaker information, an appropriate content can be provided to the speaker.

In the foregoing aspect, it is preferred that the speaker information include at least either the age or gender of the speaker. In this case, a content corresponding to at least either the age or gender of the speaker can be provided.

A speaker identification apparatus according to another aspect of the present invention is a speaker identification apparatus for identifying a speaker, having: a voice acquisition unit that acquires voice information of a speaker in the vicinity of the speaker identification apparatus; a database for storing registered voice information in connection with speaker information on a speaker; a determination unit that determines whether or not the speaker corresponding to the voice information acquired by the voice acquisition unit matches a speaker corresponding to registered voice information stored in the database in connection with speaker information on a speaker; an input accepting unit that accepts an input of the speaker information on the speaker, in a case where it is determined that the speaker corresponding to the acquired voice information does not match the speaker corresponding to the registered voice information stored in the database; and a database storage unit that stores the acquired voice information in the database as registered voice information, and stores the speaker information accepted by the input accepting unit in the database in connection with the registered voice information.

In a case where the voice information of a speaker is acquired to identify the speaker and a new speaker who is not registered in the database is identified, the method according to this aspect prompts registration of the speaker information associated with the new speaker in the database, to register the input speaker information in the database.

Therefore, without causing the speaker to execute a troublesome setting operation, the new speaker can be registered in the database.

An information management method according to another aspect of the present invention is an information management method of a speaker identification system for identifying a speaker, the method comprising the steps of: receiving voice information of the speaker; determining whether or not the speaker corresponding to the received voice information matches a speaker corresponding to registered voice information stored in a database in connection with speaker information on a speaker; in a case where it is determined that the speaker corresponding to the received voice information does not match the speaker corresponding to the registered voice information stored in the database, transmitting input promoting information for prompting the speaker to input the speaker information; receiving the speaker information that is input by the speaker in response to the input prompting information; and storing the received voice information in the database as registered voice information and storing the received speaker information in the database in connection with the registered voice information.

In a case where the voice information of a speaker is acquired to identify the speaker and a new speaker who is not registered in the database is identified, the method according to this aspect prompts registration of the speaker information associated with the new speaker in the database, to register the input speaker information in the database. Therefore, without causing the speaker to execute a troublesome setting operation, the new speaker can be registered in the database.

The embodiments of the present invention are described hereinafter with reference to the drawings.

Embodiment 3 of the present invention illustrates an example of a content providing system for providing appropriate contents in accordance with the viewer information of viewers, the content providing system being implemented by means of various communication lines, such as the Internet, in response to a viewer in front of a television (also referred to as "terminal apparatus," hereinafter).

(Configurations of the Content Providing System)

First of all, each of the configurations of the content providing system according to the present embodiment is described.

Figure 18:
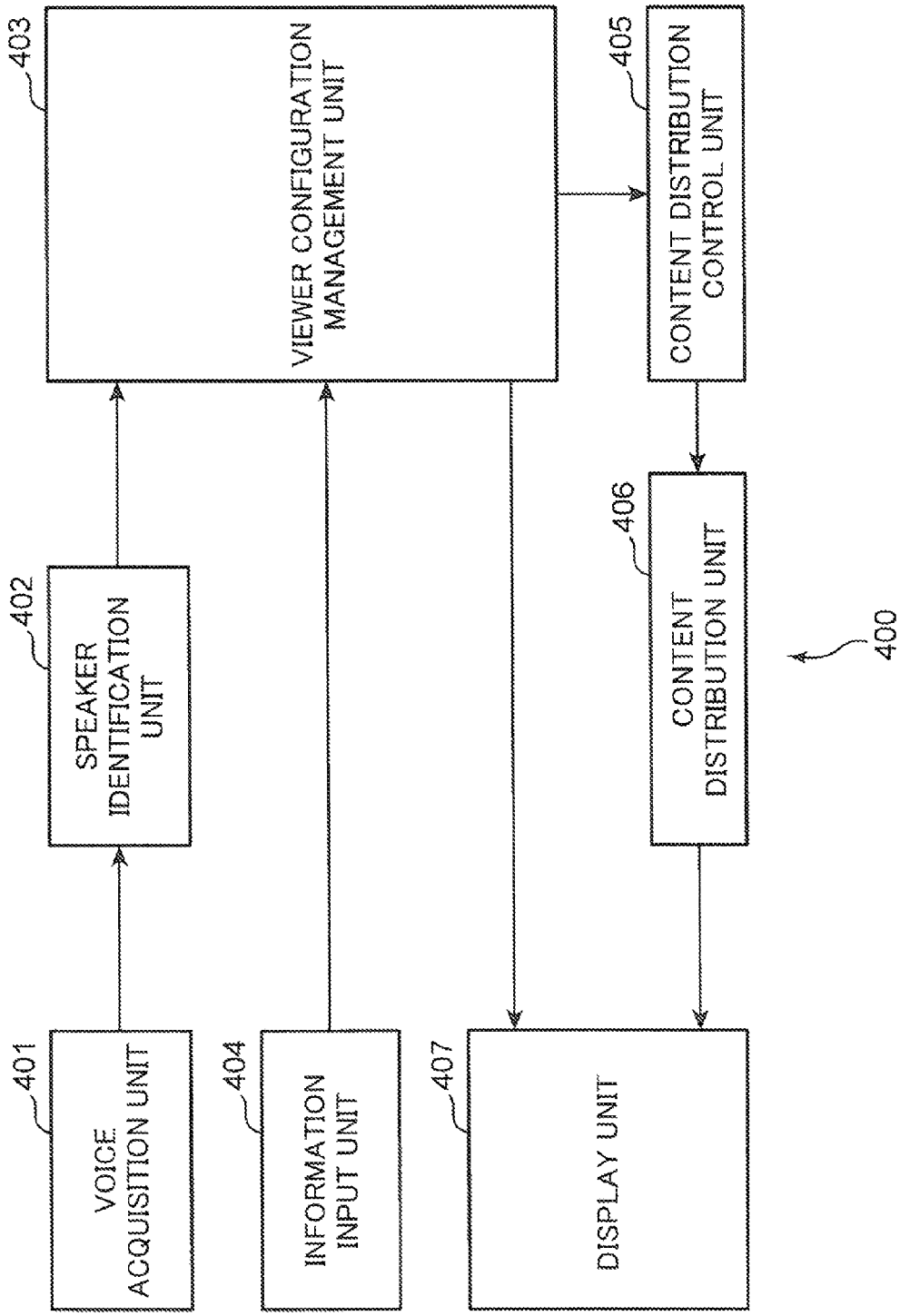
FIG. 18 is a diagram showing the entire configuration of a content providing system according to Embodiment 3 of the present invention.

FIG. 18 is a diagram showing the entire configuration of the content providing system according to Embodiment 3 of the present invention.

A content providing system 400 has a voice acquisition unit 401, a speaker identification unit 402, a viewer configuration management unit 403, an information input unit 404, a content distribution control unit 405, a content distribution unit 406, and a display unit 407.

The voice acquisition unit 401 acquires a voice signal (voice information) of a viewer (speaker). The speaker identification unit 402 identifies the speaker from the voice information acquired by the voice acquisition unit 401. The speaker identification unit 402 determines whether or not the speaker corresponding to the acquired voice information matches a speaker corresponding to registered voice information stored in a database in connection with speaker information on the speaker. Note that the speaker information includes, for example, at least either the age or gender of the speaker.

The viewer configuration management unit 403 manages viewer configuration information by using identification information acquired from the speaker identification unit 402, and when it is determined that the viewer is a new viewer, prompts input of information on the new viewer. The viewer configuration management unit 403 also receives the input information and manages the viewer configuration.

The information input unit 404 receives an input of information entered by the viewer. In a case where it is determined that the speaker corresponding to the acquired voice information does not match the speaker corresponding to the registered voice information stored in the database, the information input unit 404 receives an input of speaker information entered by the speaker. The viewer configuration management unit 403 stores the acquired voice information in the database as registered voice information and stores the received speaker information in the database in connection with the registered voice information.

The content distribution control unit 405 controls distribution of contents corresponding to the viewer configuration information managed by the viewer configuration management unit 403. The content distribution unit 406, under control of the content distribution control unit 405, distributes the contents corresponding to the viewer configuration information. The content distribution unit 406 distributes the contents corresponding to the speaker information.

The display unit 407 prompts input of information on the viewer and displays the distributed contents. Note that the content providing system 400 may not necessarily have all these configurations but may have some of these configurations.

The content providing system 400 can be divided into, for example, a terminal apparatus of the viewer and a server apparatus that distribute contents. The components of the terminal apparatus described hereinafter are realized by hardware installed in a television, an example of the terminal apparatus, such as a microphone, CPU (Central Processing Unit), ROM (Read Only Memory) with control programs stored therein, and various communication ICs (Integrated Circuits). The components of the server apparatus are realized by hardware configuring a computer, such as a CPU, ROM with control programs stored therein, and various communication ICs.

A configuration example of each of the apparatuses for realizing the content providing system are described hereinafter using a process block diagram (configuration diagram) of a content providing system 500 shown in FIG. 19.

Figure 19:
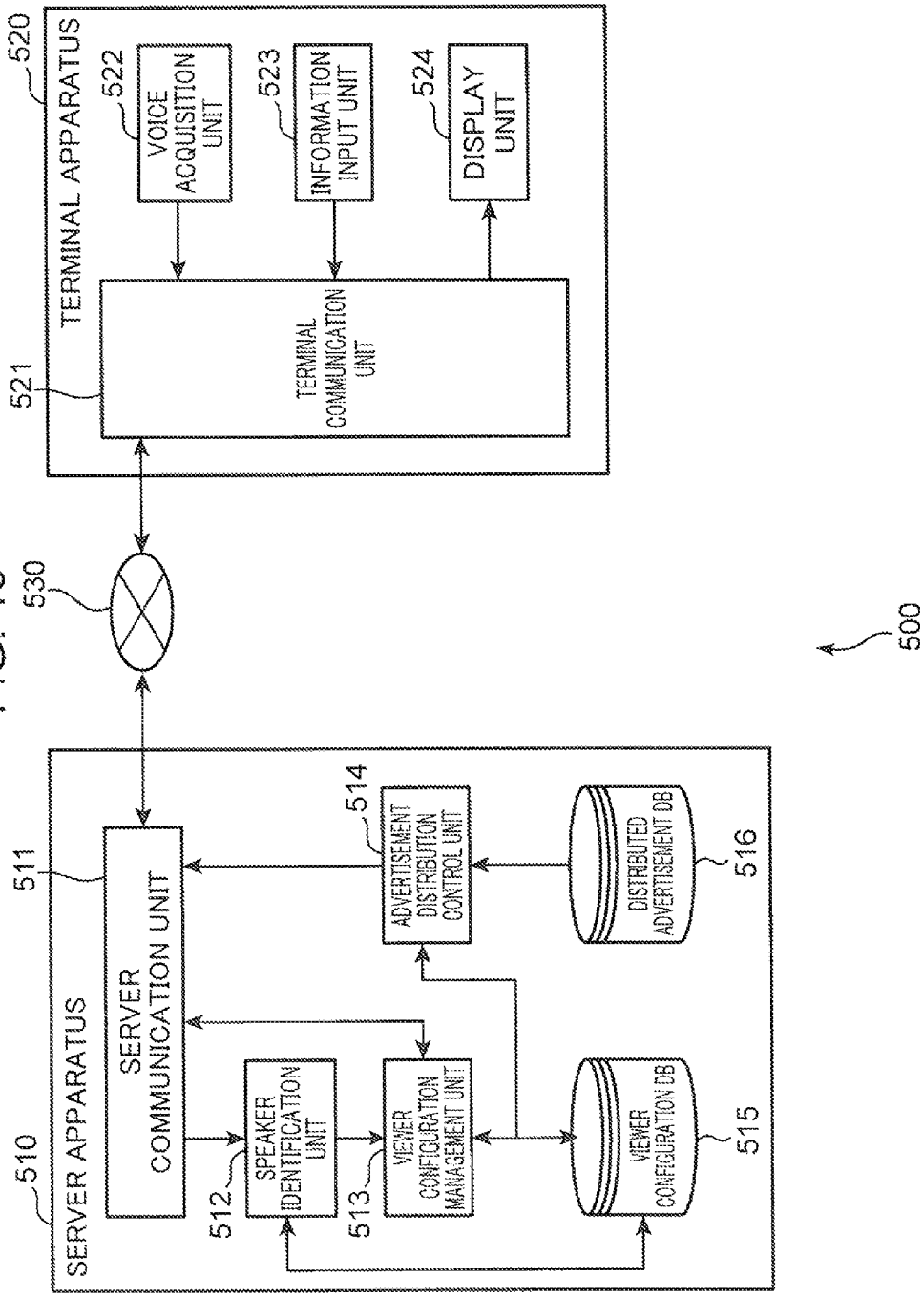
FIG. 19 is a block diagram showing a configuration of the content providing system according to Embodiment 3 of the present invention.

FIG. 19 is a block diagram showing a configuration of the content providing system according to Embodiment 3 of the present invention. The content providing system 500 shown in FIG. 19 shows an example of the configuration of the content providing system 400 shown in FIG. 18. The content providing system 500 and the content providing system 400 are the same but described using different reference numerals, for convenience.

The content providing system 500 shown in FIG. 19 has a server apparatus 510 and a terminal apparatus 520.

The server apparatus 510 has a server communication unit 511, a speaker identification unit 512, a viewer configuration management unit 513, an advertisement distribution control unit 514, a viewer configuration DB (Data Base) 515, and a distributed advertisement DB (Data Base) 516. The place where the server apparatus 510 is located is not particularly limited. The server apparatus 510 may be located in a data center where big data is handled or may be located in each individual household. The data center is held by a company that manages and runs the data center. The configurations of the server apparatus 510 may be placed as a group in a single apparatus or in different apparatuses.

The terminal apparatus 520 has a terminal communication unit 521, a voice acquisition unit 522, an information input unit 523, and a display unit 524. The terminal apparatus 520 may be any device with these configurations. The terminal apparatus 520 is configured by, for example, a television, PC (personal computer), display connected to the PC, and the like that are installed in a household. The terminal apparatus 520 may also be configured by a portable terminal such as a cellular phone, a smartphone, or a tablet terminal. The terminal apparatus 520 may not necessarily have these configurations therein. For instance, only the voice acquisition unit 522 may be attached to the outside of the terminal apparatus 520. The content providing system 500 may have a plurality of the terminal apparatuses 520, each of which may be connected to the server apparatus 510.

The server communication unit 511 receives line data by means of a communication line 530, which is a public line such as the Internet. With the received line data, the server communication unit 511 extracts a viewer voice signal transmitted by the terminal apparatus 520 and outputs the viewer voice signal to the speaker identification unit 512. With the received line data, the server communication unit 511 also extracts viewer tag data transmitted by the terminal apparatus 520 and outputs the viewer tag data to the viewer configuration management unit 513. The server communication unit 511 outputs a registration prompting signal and advertisement data to the communication line 530 as the line data, the registration prompting signal and advertisement data being generated when a new speaker is detected, and transmits the registration prompting signal and advertisement data to the terminal apparatus 520 through the communication line 530.

The speaker identification unit 512 acquires the viewer voice signal that is output by the server communication unit 511, to identify the speaker, and the outputs thus obtained speaker identification result to the viewer configuration management unit 513. The speaker identification unit 512 compares the acquired viewer voice signal with registered voice signals registered in the viewer configuration DB 515, to identify the speaker. In so doing, in a case where the acquired viewer voice signal does not match the registered voice signals registered in the viewer configuration DB 515, the speaker identification unit 512 detects a new speaker.

In a case where a new speaker is detected by the speaker identification unit 512, the viewer configuration management unit 513 outputs a registration prompting signal to the server communication unit 511. Specifically, in a case where the speaker identified by the speaker identification unit 512 is not registered in the viewer configuration stored in the viewer configuration DB 515, the viewer configuration management unit 513 outputs a registration prompting signal to the server communication unit 511. The viewer configuration management unit 513 also acquires from the server communication unit 511 the viewer tag data that is input by the viewer, manages the tag information associated with the viewer configuration, and then outputs the viewer configuration information.

The advertisement distribution control unit 514 selects, from the distributed advertisement DB 516, an advertisement to be distributed to the terminal based on the viewer configuration information, and outputs the selected advertisement to the server communication unit 511.

The viewer configuration DB 515 is a database for storing the viewer configuration information managed by the viewer configuration management unit 513. In a case where a plurality of the terminal apparatuses 520 exist, the viewer configuration DB is created for each of the terminal apparatuses and managed based on the IP address or ID corresponding to each of the terminal apparatuses.

The distributed advertisement DB 516 is a database for storing advertisement data distributed and managed by the advertisement distribution control unit 514.

The terminal communication unit 521 receives the line data through the communication line 530, which is a public line such as the Internet. The terminal communication unit 521 receives the advertisement data and registration prompting signal transmitted by the server apparatus 510 and outputs the received advertisement data and registration prompting signal to the display unit 524. The terminal communication unit 521 also outputs the viewer voice signal acquired by the voice acquisition unit 522 to the communication line 530, and outputs the viewer tag data input by the information input unit 523 to the communication line 530.

The voice acquisition unit 522 acquires the viewer voice signal and outputs it to the terminal communication unit 521.

When a registration prompting screen resulting from the registration prompting signal is displayed on the display unit 524, the information input unit 523 receives an input of the viewer tag data associated with the new viewer, and outputs the input viewer tag data to the terminal communication unit 521.

Upon reception of the registration prompting signal, the display unit 524 then displays a screen for prompting input of the viewer tag data. The display unit 524 also displays the received distributed advertisement data.

The above is the configuration of each of the apparatuses in the content providing system 500. Note that the apparatuses may not necessarily have the configurations described above but may have some of these configurations. Each of the apparatuses may have a configuration provided with other functions.

(Operations of the Content Providing System)

Next, the operations of the content providing system 500 are described. The detailed operations of the apparatuses (the terminal apparatus 520 and the server apparatus 510) are described hereinafter. The operations and a flow of processes of the entire content providing system 500 are now roughly described.

Figure 20:
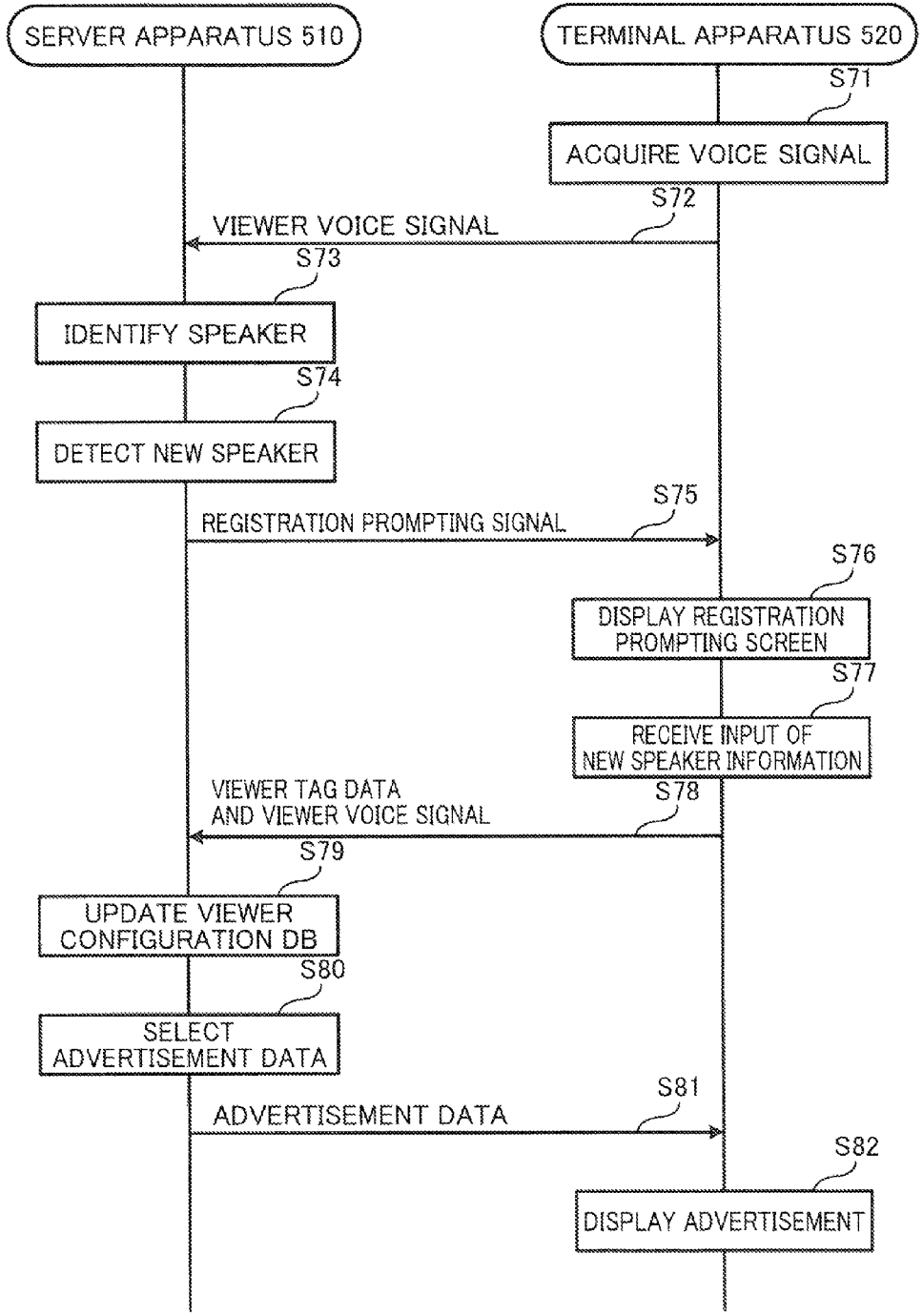
FIG. 20 is a sequence diagram showing an example of operations of the content providing system according to Embodiment 3 of the present invention.

FIG. 20 is a sequence diagram showing an example of the operations of the content providing system 500 according to Embodiment 3 of the present invention. Note that FIG. 20 shows a case in which a new viewer is detected by the terminal apparatus 520.

First, the voice acquisition unit 522 of the terminal apparatus 520 acquires a voice signal of a viewer of the terminal apparatus 520 (step S71). Note that step S71 corresponds to the process that is executed by the voice acquisition unit 401 of the content providing system 400 shown in FIG. 18.

Next, the terminal communication unit 521 of the terminal apparatus 520 transmits the acquired viewer voice signal to the server apparatus 510 through the communication line 530 (step S72). In so doing, the terminal communication unit 521 may transmit the other information on the terminal apparatus 520 such as the ID or IP address for specifying the user of the terminal apparatus 520 together with the viewer voice signal. The server communication unit 511 of the server apparatus 510 receives the viewer voice signal transmitted by the terminal apparatus 520.

Next, the speaker identification unit 512 of the server apparatus 510 identifies the speaker by using the viewer voice signal transmitted from the terminal apparatus 520 through the communication line 530 and the viewer configuration DB 515 corresponding to the terminal apparatus 520 that acquired the viewer voice signal (step S73). Note that extraction from the viewer configuration DB 515 corresponding to the terminal apparatus 520 may be executed based on the information with which a place where the IP address and the like transmitted by the terminal apparatus 520 are stored can be specified. Step S73 corresponds to the process that is executed by the speaker identification unit 402 of the content providing system 400 shown in FIG. 18.

Subsequently, the speaker identification unit 512 detects a new speaker who is not registered in the viewer configuration DB 515 (step S74). In other words, in a case where the registered voice signals registered in the viewer configuration DB 515 include a registered voice signal that matches the received viewer voice signal, the speaker identification unit 512 determines that the speaker corresponding to the viewer voice signal is the speaker corresponding to this registered voice signal. However, in a case where the registered voice signals registered in the viewer configuration DB 515 do not include any registered voice signal that matches the received viewer voice signal, the speaker identification unit 512 determines that the speaker corresponding to the viewer voice signal is a new speaker who is not registered in the viewer configuration DB 515. A new speaker is detected in this manner.

Next, the server communication unit 511 of the server apparatus 510 transmits a registration prompting signal for prompting registration of tag information in the database to the terminal apparatus 520 through the communication line 530, the tag information being associated with the new speaker (step S75). The terminal communication unit 521 of the terminal apparatus 520 receives the registration prompting signal transmitted through the communication line 530. At this moment, the new speaker may be detected on condition that the voice signals of the new speaker are detected consecutively for a predetermined period of time (several days). Such a configuration can prevent erroneous identification of the voice of a briefly visiting guest as the voice of a fixed viewer such as a family member.

Next, the display unit 524 displays the registration prompting screen for prompting input of the tag information associated with the new speaker (step S76). Step S76 corresponds to the process that is executed by the display unit 407 of the content providing system 400 shown in FIG. 18. The registration prompting screen may be displayed at an edge of the display screen displaying the program and other contents so as not to interfere with the viewing of the contents. In addition, the registration prompting screen may be displayed when the power of the terminal apparatus 520 is turned ON/OFF so as not to interfere with the viewing of the contents.

Next, the information input unit 523 receives an input of new speaker information including the viewer voice signal and the information on the viewer (viewer tag data) associated with the viewer voice signal (step S77). The new speaker inputs the new speaker information in accordance with the display of the registration prompting screen. Step S77 corresponds to the process that is executed by the information input unit 404 of the content providing system 400 shown in FIG. 18.

Figure 21:
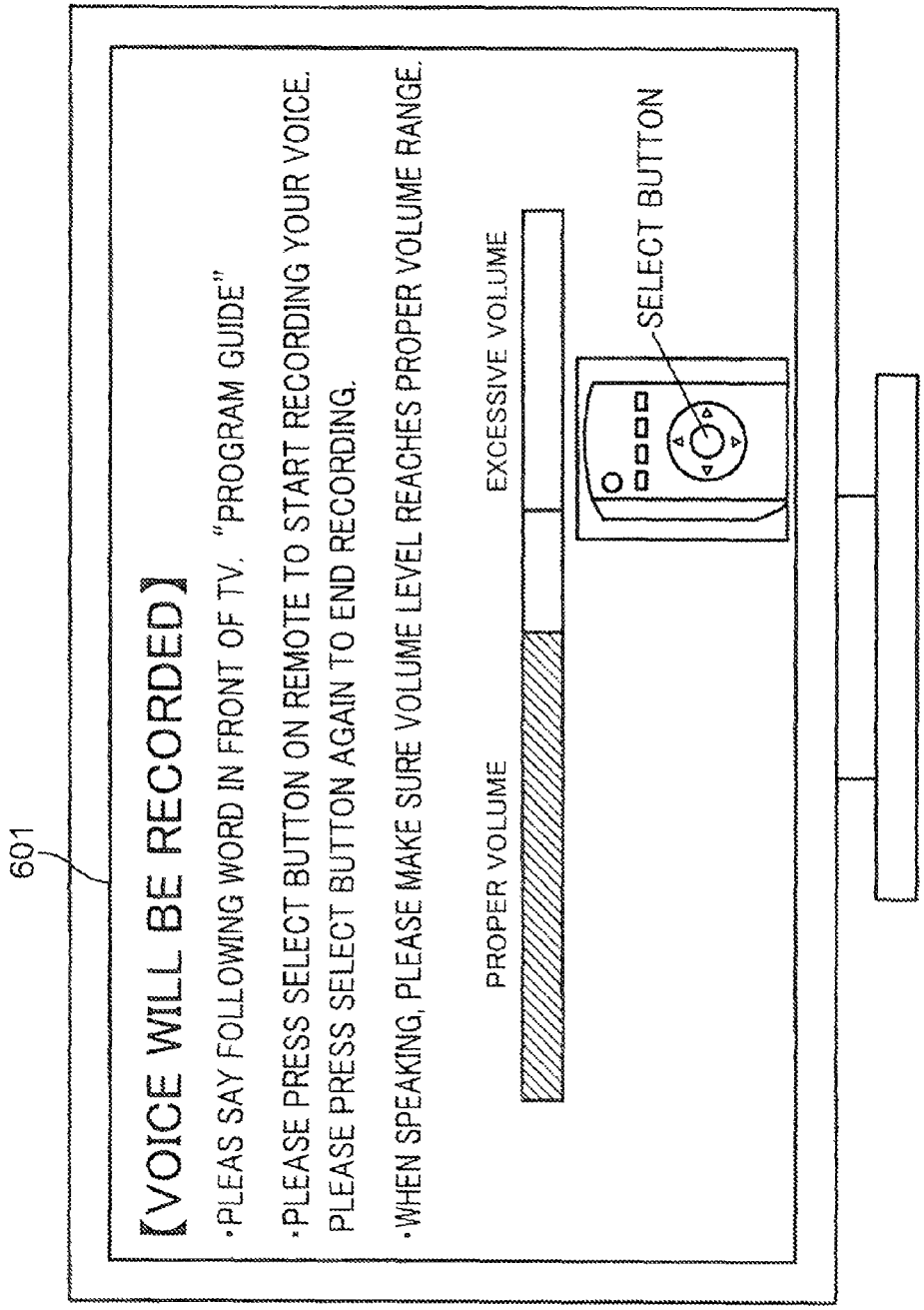
FIG. 21 is a diagram showing an example of a display screen for inputting a voice signal of a speaker at the time of new speaker registration.
Figure 22:
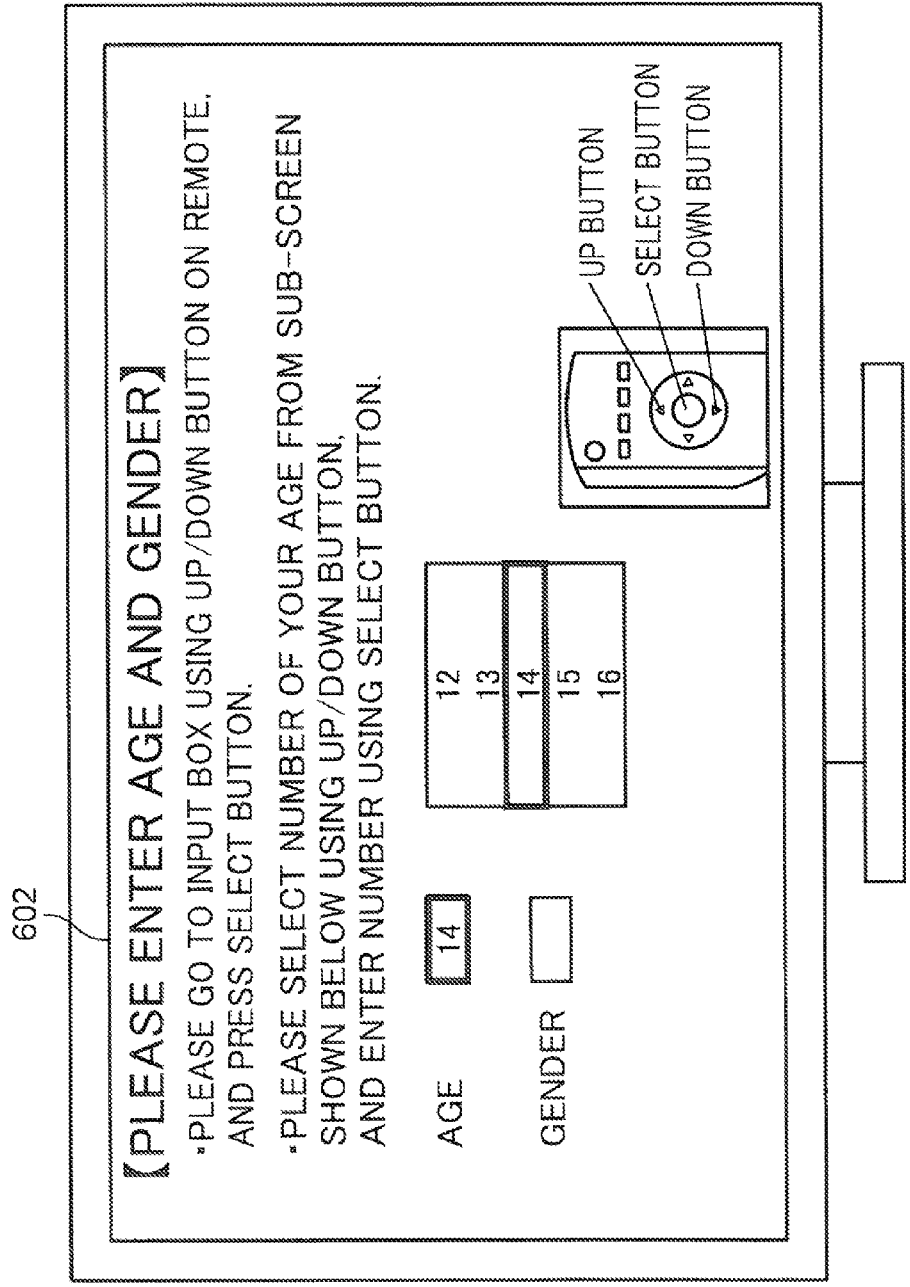
FIG. 22 is a diagram showing an example of a display screen for inputting the age and gender of the speaker at the time of new speaker registration.
Figure 23:
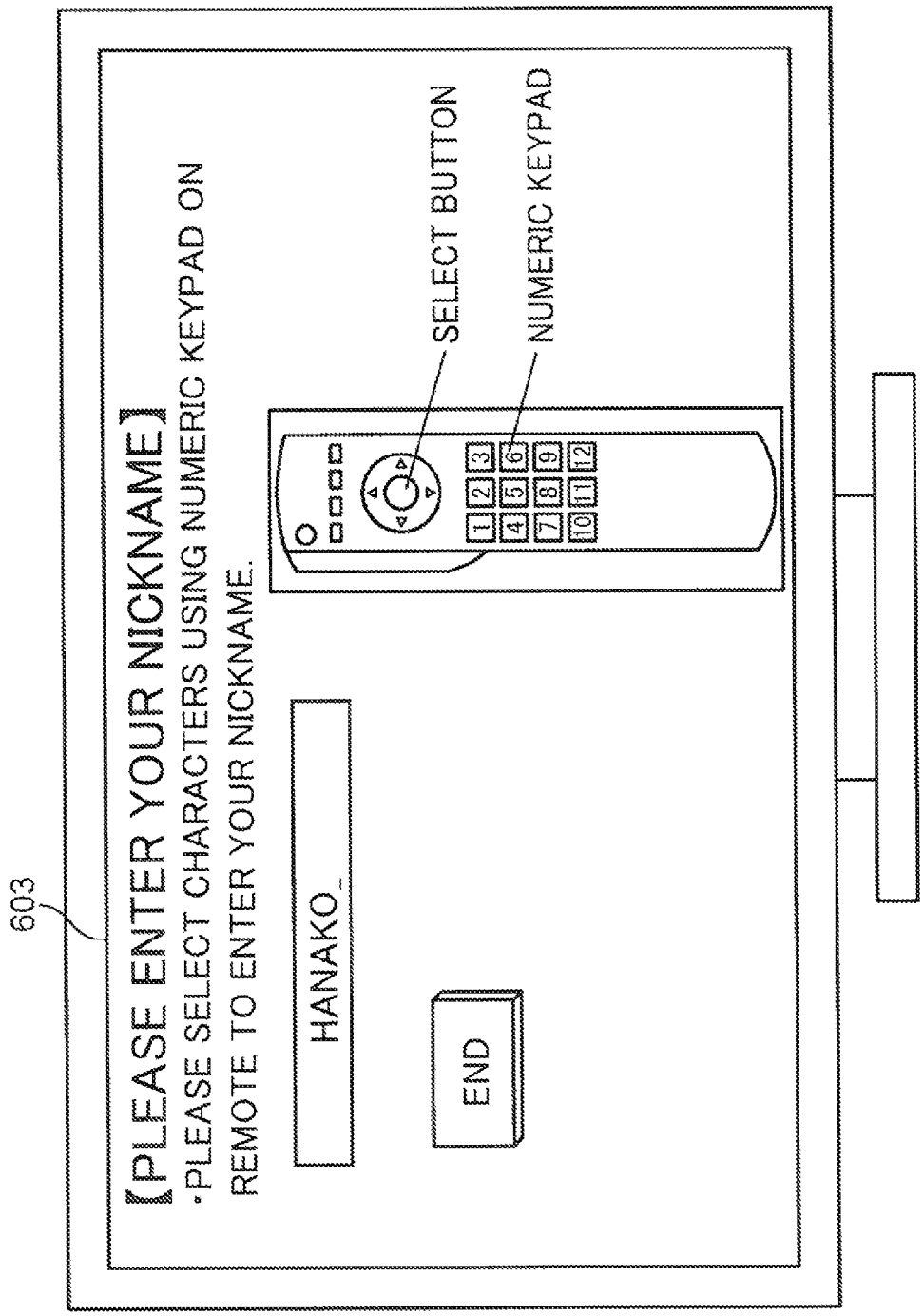
FIG. 23 is a diagram showing an example of a display screen for inputting a nickname of the speaker at the time of new speaker registration.

FIG. 21 is a diagram showing an example of the display screen for inputting a voice signal of a speaker at the time of new speaker registration. FIG. 22 is a diagram showing an example of a display screen for inputting the age and gender of the speaker at the time of new speaker registration. FIG. 23 is a diagram showing an example of a display screen for inputting a nickname of the speaker at the time of new speaker registration.

In order to ensure the association between a voice signal and tag information of the new speaker, the voice acquisition unit 522 first acquires a voice signal. When a voice is acquired, a display screen 601 (FIG. 21) displays a voice level meter for reliably recording the voice of a user, vocabulary that the user speaks, and the like. A voice signal of the new speaker is acquired through a simple operation such as an operation on a select button on the remote.

After the voice signal is acquired, the information input unit 523 receives input of tag data associated with the speaker. The tag data here includes a nickname and the age and gender of the new speaker. At the time of inputting the age and gender, the display screen 602 (FIG. 22) receives input thereof through a simple remote operation on the remote. The user then moves to the input boxes for inputting the age and the gender respectively, selects the relevant items displayed on a sub-screen, and completes the input by pressing a select button.

Furthermore, when inputting the nickname, the user inputs his/her nickname on a display screen 603 (FIG. 23) through the use of a numeric keypad. After completion of the input of a nickname, the user moves to an end button and presses a select button, completing the input of the tag data.

After completion of these input processes, the terminal communication unit 521 transmits the viewer tag data and viewer voice signal corresponding to the new speaker to the server apparatus 510 through the communication line 530 (step S78). The server communication unit 511 of the server apparatus 510 receives the viewer tag data and viewer voice signal that are transmitted by the terminal apparatus 520.

Subsequently, the viewer configuration management unit 513 of the server apparatus 510 updates the viewer configuration DB 515 by storing in the viewer configuration DB 515 the viewer tag data and viewer voice signal that are received by the server communication unit 511 (step S79). Step S79 corresponds to the process that is executed by the viewer configuration management unit 403 of the content providing system 400 shown in FIG. 18.

FIG. 24 is a diagram showing an example of a data configuration of the viewer configuration DB 515. As shown in FIG. 24, the viewer configuration DB 515 has the age, gender, and acquired viewer voice signal associated with each of the nicknames that represent the viewers. Note that the database constructed in the viewer configuration DB 515 is not limited to the example shown in FIG. 24.

Next, the advertisement distribution control unit 514 of the server apparatus 510 selects, from the distributed advertisement DB 516, advertisement data corresponding to the information on each viewer stored in the viewer configuration DB 515 (step S80). The method for selecting an advertisement is not particularly limited. For instance, the distributed advertisement DB 516 stores the advertisement data to be distributed in association with the ages and genders. For example, an advertisement for a car is associated with a male in his 40s, and an advertisement for a cosmetic product is associated with a female in her 30s. The advertisement distribution control unit 514 selects an advertisement optimal for the age and gender of each user. Step S80 corresponds to the process that is executed by the content distribution control unit 405 of the content providing system 400 shown in FIG. 18.

Note that the distributed advertisement DB 516 may not only store the advertisement data associated only with ages but also store the advertisement data associated only with the genders. The distributed advertisement DB 516 may also store the advertisement data in association with the information on each viewer other than his/her age and gender. In a case where addresses of the viewers are stored in the viewer configuration DB 515, the distributed advertisement DB 516 may store the advertisement data in association with the addresses in advance, and the advertisement distribution control unit 514 may select the advertisement data of the stores closest to the addresses of the viewers.

Next, the server communication unit 511 transmits the advertisement data selected by the advertisement distribution control unit 514 to the terminal apparatus 520 via the communication line 530 (step S81). The terminal communication unit 521 of the terminal apparatus 520 receives the advertisement data transmitted by the server apparatus 510.

Subsequently, the display unit 524 of the terminal apparatus 520 displays the advertisement data distributed by the server apparatus 510 (step S82). Step S82 corresponds to the process that is executed by the content distribution unit 406 of the content providing system 400 shown in FIG. 18.

The above are the operations of the content providing system 500.

(Operations of the Server Apparatus)

The operations of the server apparatus 510 of the content providing system 500 according to Embodiment 3 are described next.

Figure 25:
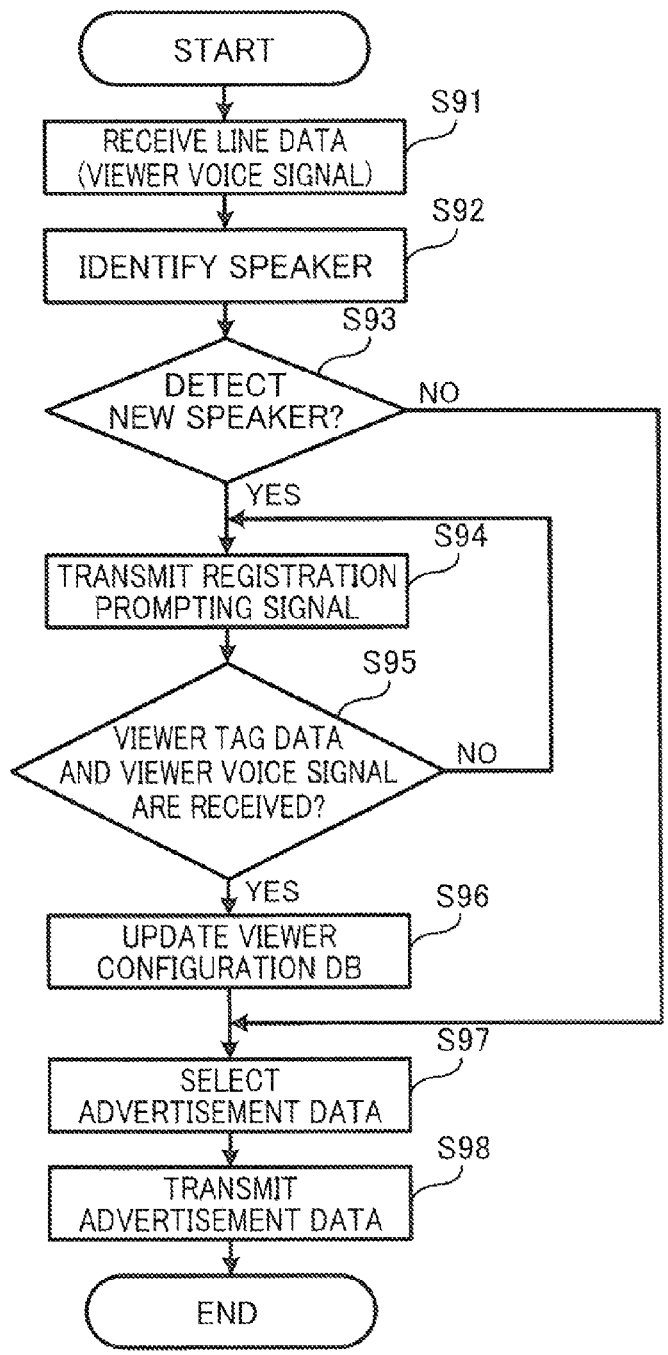
FIG. 25 is a flowchart showing an example of operations of a server apparatus according to Embodiment 3 of the present invention.

FIG. 25 is a flowchart showing an example of the operations of the server apparatus 510 according to Embodiment 3 of the present invention. The server apparatus 510 may start its operations shown in FIG. 25, for example, when its power switch or a function related thereto (not shown in FIG. 19) is turned ON and may end the operations when the power switch or the function related thereto is turned OFF.

First, in step S91, the server communication unit 511 of the server apparatus 510 receives line data by means of the communication line 530. In so doing, the server communication unit 511 acquires the viewer voice signal transmitted by the terminal apparatus 520.

In the next step S92, the speaker identification unit 512 identifies the speaker corresponding to the acquired viewer voice signal. The speaker identification unit 512 identifies the speaker by collating the received viewer voice signal with the viewer configuration DB 515 of each terminal apparatus.

Next, in step S93, the speaker identification unit 512 uses the result of speaker identification to determine whether a new speaker is detected or not. In a case where the received viewer voice signal is not registered in the viewer configuration DB 515, the speaker identification unit 512 determines that a new speaker is detected. In a case where the received viewer voice signal is registered in the viewer configuration DB 515, the speaker identification unit 512 determines that a new speaker is not detected. Note that a new speaker may be detected on condition that the new speaker to be detected is a speaker who is absent from the viewer configuration DB 515 over a predetermined period of time (several days). Such a configuration can prevent erroneous identification of the voice of a briefly visiting guest as the voice of a fixed viewer such as a family member. In a case where it is determined that a new speaker is detected (YES in step S93), the process proceeds to step S94 to register the new speaker. However, in a case where it is determined that a new speaker is not detected (NO in step S93), the process proceeds to step S97.

In step S94, the viewer configuration management unit 513 creates a registration prompting signal for registering the information on the new speaker in the viewer configuration DB 515 and outputs the registration prompting signal to the server communication unit 511, and the server communication unit 511 transmits the registration prompting signal.

In the next step S95, the viewer configuration management unit 513 determines whether the viewer tag data and viewer voice signal corresponding to the new speaker are received by the server communication unit 511 or not. In a case where the registration prompting signal is transmitted but the viewer tag data and viewer voice signal are not transmitted from the terminal apparatus 520, or in other words, in a case where it is determined by the server apparatus 510 that the viewer tag data and viewer voice signal are not received (NO in step S95), the process returns to step S94 to prompt continuous registration.

However, in a case where the viewer tag data and viewer voice signal are transmitted from the terminal apparatus 520, or in other words, in a case where it is determined that the viewer tag data and viewer voice signal are received (YES in step S95), the process proceeds to step S96.

In step S96, the viewer configuration management unit 513 updates the viewer configuration DB 515 of each terminal apparatus. Specifically, the viewer configuration management unit 513 updates the viewer configuration DB 515 by using the viewer tag data input by the information input unit 523 and the viewer voice signal acquired by the voice acquisition unit 522. As shown in FIG. 24, the viewer configuration DB 515 is updated by having the ages, genders and viewer voice signals associated with the nicknames of new speakers. The viewer configuration management unit 513 stores the viewer tag data and viewer voice signal received by the server communication unit 511 in the viewer configuration DB 515.

Note that, in the present embodiment, a viewer voice signal, which is newly acquired by the terminal apparatus 520 that receives the registration prompting signal acquires, is received and stored in the viewer configuration DB 515; however, the present invention is not particularly limited to this configuration. The server apparatus 510 may receive the viewer tag data only, and store in the viewer configuration DB 515 the received viewer tag data in connection with the viewer voice signal received in step S91.

Next, in step S97, the advertisement distribution control unit 514 selects, from the distributed advertisement DB 516, advertisement data corresponding to the information on the viewer (the identified speaker or the new speaker) stored in the viewer configuration DB 515. Specifically, the advertisement distribution control unit 514 extracts from the distributed advertisement DB 516 the advertisement data corresponding to the age and gender of the identified speaker or the new speaker stored in the viewer configuration DB 515, and outputs the extracted advertisement data to the server communication unit 511.

In the next step S98, the server communication unit 511 transmits the advertisement data selected by the advertisement distribution control unit 514 to the terminal apparatus 520 via the communication line 530.

The above are the operations of the server apparatus 510.

(Operations of the Terminal Apparatus)

The operations of the terminal apparatus 520 of the content providing system 500 according to this Embodiment 3 are described next.

Figure 26:
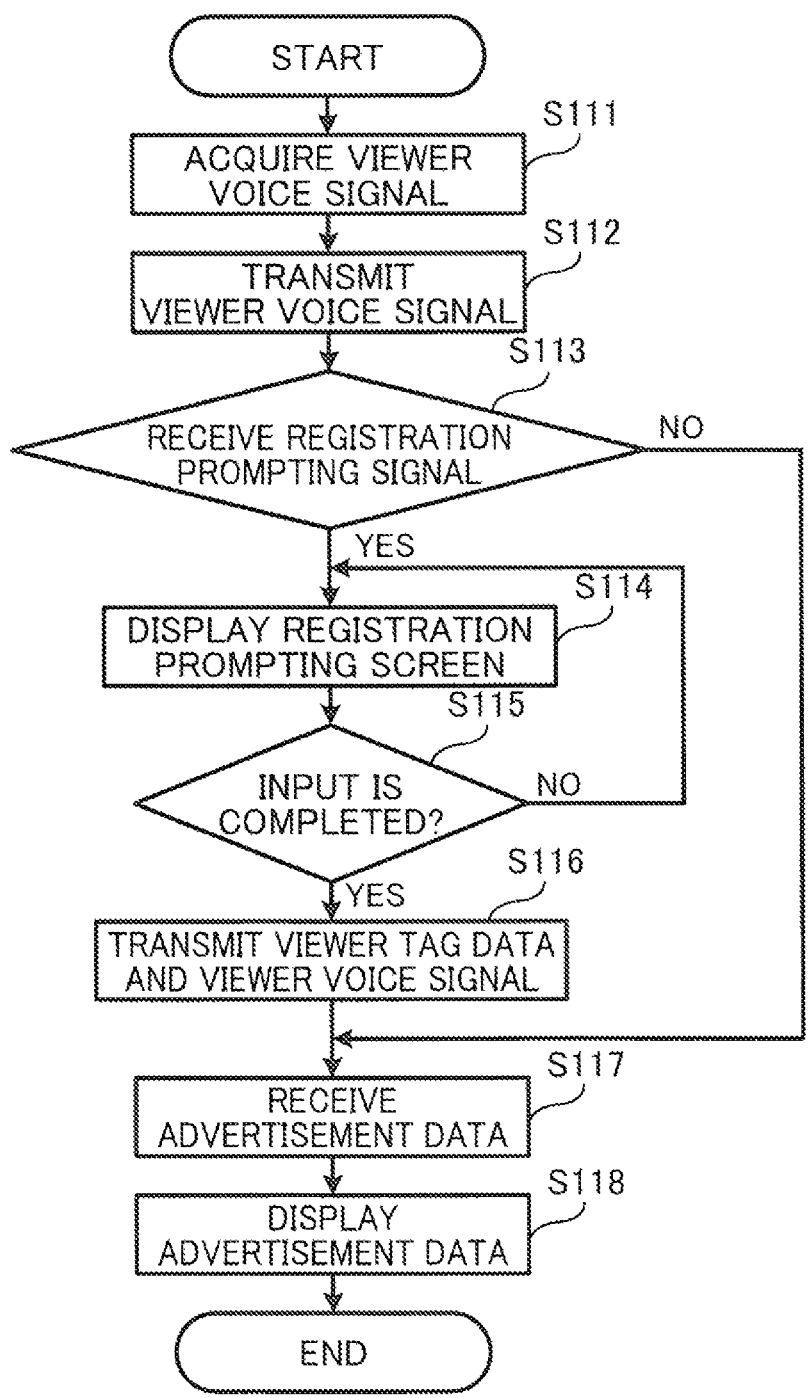
FIG. 26 is a flowchart showing an example of operations of a terminal apparatus according to Embodiment 3 of the present invention.

FIG. 26 is a flowchart showing an example of the operations of the terminal apparatus 520 according to Embodiment 3 of the present invention. The terminal apparatus 520 may start its operations shown in FIG. 26, for example, when its power switch or the function related thereto (not shown in FIG. 19) is turned ON and may end the operations when the power switch or the function related thereto is turned OFF. In a case where the terminal apparatus 520 is a television, the basic function thereof can be a function for displaying a broadcast program (content); however, in this content providing system, the detailed description of how a content is displayed is omitted, and only how advertisements are distributed is described.

First, in step S111, the voice acquisition unit 522 acquires a viewer voice signal representing a vocal sound made by a viewer in the vicinity of the terminal apparatus 520. The voice acquisition unit 522 then outputs the acquired viewer voice signal to the terminal communication unit 521.

In the next step S112, the terminal communication unit 521 transmits the viewer voice signal acquired by the voice acquisition unit 522 to the server apparatus 510 via the communication line 530. The terminal communication unit 521 outputs the viewer voice signal to the communication line 530 as the line data.

In the next step S113, the terminal communication unit 521 determines whether a registration prompting signal to be transmitted by the server apparatus 510 is received or not. When it is determined that a registration prompting signal is received (YES in step S113), the process proceeds to step S114. The terminal communication unit 521 outputs the received registration prompting signal to the display unit 524. However, when it is determined that a registration prompting signal is not received (NO in step S113), the process proceeds to step S117.

In step S114, the display unit 524 displays the registration prompting screen for prompting input of the information on a new speaker. The information input unit 523 here receives the input of the viewer voice signal of the new speaker and the viewer tag data associated with the viewer voice signal of the new speaker.

In the next step S115, the terminal communication unit 521 determines whether the input of the viewer voice signal of the new speaker and the viewer tag data associated with the viewer voice signal of the new speaker is completed or not. In a case where it is determined that the input is not yet completed (NO in step S115), the process returns to step S114 in which the display unit 524 continues to display the registration prompting screen. However, in a case where it is determined that the input is completed (YES in step S115), the process proceeds to step S116.

In the next step S116, the terminal communication unit 521 transmits, to the server apparatus 510, the viewer voice signal of the new speaker and the viewer tag data (the age, gender and nickname) associated therewith, which are input by the information input unit 523 through the remote in accordance with the registration prompting screen displayed by the display unit 524.

In the next step S117, the terminal communication unit 521 receives the advertisement data transmitted by the server apparatus 510.

In the next step S118, the display unit 524 displays the advertisement data received by the terminal communication unit 521.

The above are the operations of the terminal apparatus 520.

In a case where a vocal sound made by a speaker is acquired from the terminal apparatus and the speaker is identified as the same unknown speaker over a certain period of time, the operations described above consider this speaker a new member to the viewers who use the terminal apparatus. Consequently, registration of the speaker information on the new speaker into the database is prompted, registering the input speaker information in the database. As a result, a database for storing information on each of the members of the family having the terminal apparatus can be constructed. In addition, the content providing system that distributes an advertisement suitable for each viewer can be provided.

The system according to the present embodiment is described as the content providing system that provides contents, but may be a viewer configuration DB construction management system for constructing a database. In this case, the system shown in FIG. 18 does not have to be provided with such components as the content distribution control unit 405 and the content distribution unit 406. Moreover, the server apparatus 510 shown in FIG. 19 does not have to be provided with such components as the advertisement distribution control unit 514 and the distributed advertisement DB 516. The flowchart shown in FIG. 20 does not have to have the processes subsequent to step S80. The flowchart shown in FIG. 25 also does not have to have the processes subsequent to step S97. In addition, the flowchart shown in FIG. 26 does not have to have the processes subsequent to step S117.

Embodiment 4

A content providing system according to Embodiment 4 of the present invention is described hereinafter. Note that the descriptions of the configurations of Embodiment 4 that are the same as those of Embodiment 3 are omitted. The technology according to Embodiment 4 can be combined with the technology described in Embodiment 3.

While Embodiment 3 is configured to transmit a voice signal acquired by the terminal apparatus to the server apparatus that identifies the speaker and manages the information on the speaker, Embodiment 4 is configured to allow a terminal apparatus to identify the speaker and manage the information on the speaker, so only the information on the speaker is transmitted from the terminal apparatus to the server apparatus. The content providing system of Embodiment 4, therefore, can not only reduce the amount of data to be transmitted, but also be applied to a low-capacity communication line.

A configuration of the content providing system according to Embodiment 4 is described hereinafter.

(Configuration of the Content Providing System)

Figure 27:
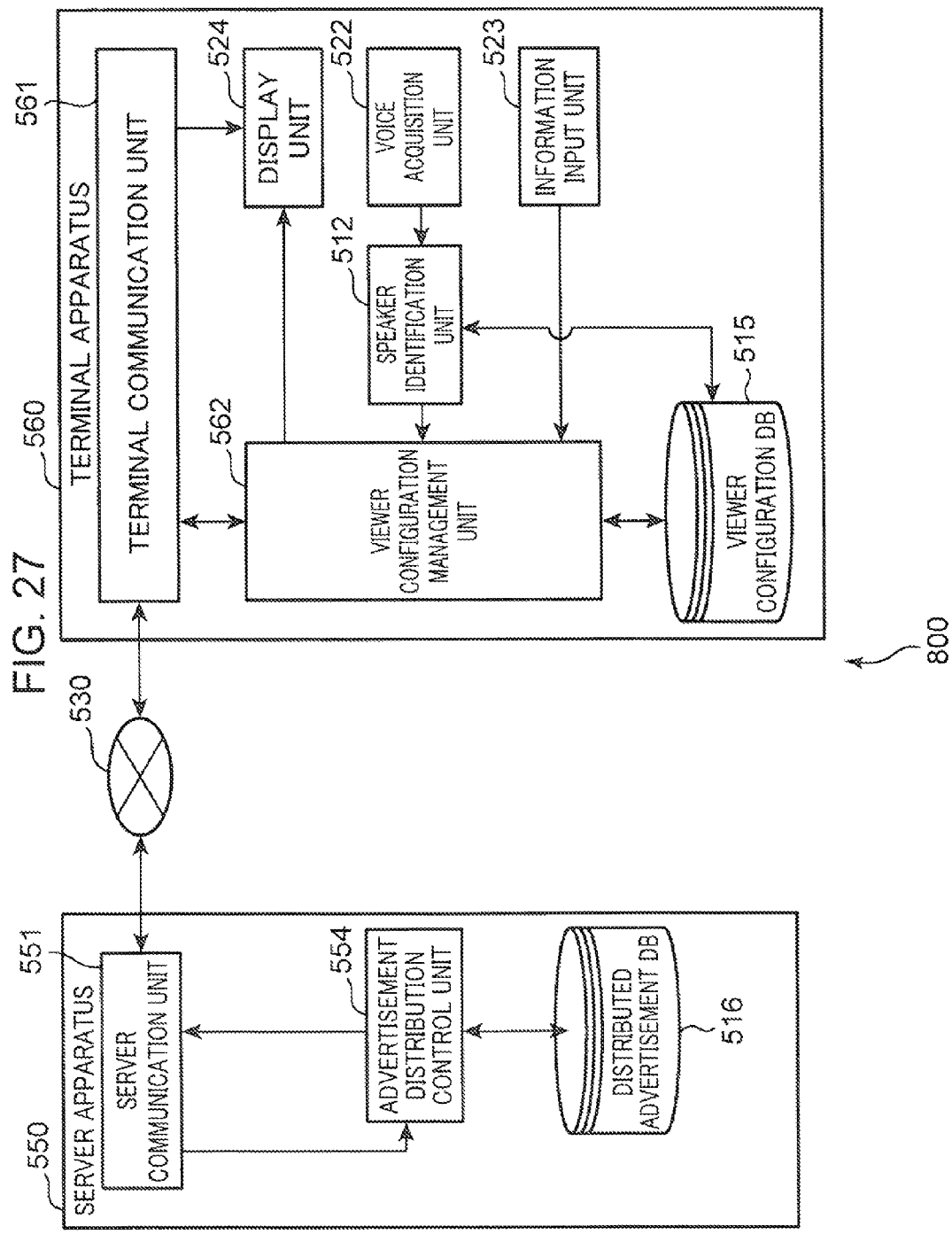
FIG. 27 is a block diagram showing an example of a configuration of a content providing system according to Embodiment 4 of the present invention.

FIG. 27 is a block diagram showing an example of the configuration of the content providing system according to Embodiment 4 of the present invention. Note in FIG. 27 that the same reference numerals are used on the components same as those shown in FIG. 19; thus, the descriptions thereof are omitted accordingly.

A content providing system 800 shown in FIG. 27 has a server apparatus 550 and a terminal apparatus 560.

The server apparatus 550 has a server communication unit 551, an advertisement distribution control unit 554, and a distributed advertisement DB (Data Base) 516.

The terminal apparatus 560 has a speaker identification unit 512, a terminal communication unit 561, a viewer configuration management unit 562, a viewer configuration DB (Data Base) 515, a voice acquisition unit 522, an information input unit 523, and a display unit 524.

The server communication unit 551 receives line data by means a communication line 530, which is a public line such as the Internet. With the received line data, the server communication unit 551 extracts viewer configuration information transmitted by the terminal apparatus 560 and outputs the viewer configuration information to the advertisement distribution control unit 514. The server communication unit 551 also outputs advertisement data to the communication line 530 as the line data, and transmits the advertisement data to the terminal apparatus 520 by means of the communication line 530.

The advertisement distribution control unit 554 selects advertisement data from the distributed advertisement DB 516 based on the viewer configuration information received by the server communication unit 551, and outputs the selected advertisement data to the server communication unit 551.

The terminal communication unit 561 receives the line data by means of the communication line 530, which is a public line such as the Internet. The terminal communication unit 561 receives the advertisement data transmitted by the server apparatus 550, and outputs the received advertisement data to the display unit 524. The terminal communication unit 561 also converts the viewer configuration information, output by the viewer configuration management unit 562, into line data, and outputs the line data to the communication line 530.

The viewer configuration management unit 562 transmits a registration prompting signal to the display unit 524 in a case where a new speaker is detected by the speaker identification unit 512. The viewer configuration management unit 562 also acquires a viewer voice signal and viewer tag data that are input by a viewer using the information input unit 523, and updates the information in the viewer configuration DB 515. Furthermore, the viewer configuration management unit 562 outputs the viewer configuration information of the viewer configuration DB 515 to the terminal communication unit 561.

The above is the configuration of the content providing system 800.

(Operations of the Content Providing System)

The operations of the content providing system 800 are described next. The detailed operations of the apparatuses (the terminal apparatus 560 and the server apparatus 550) are described hereinafter. The operations and a flow of processes of the entire content providing system 800 are now roughly described.

Figure 28:
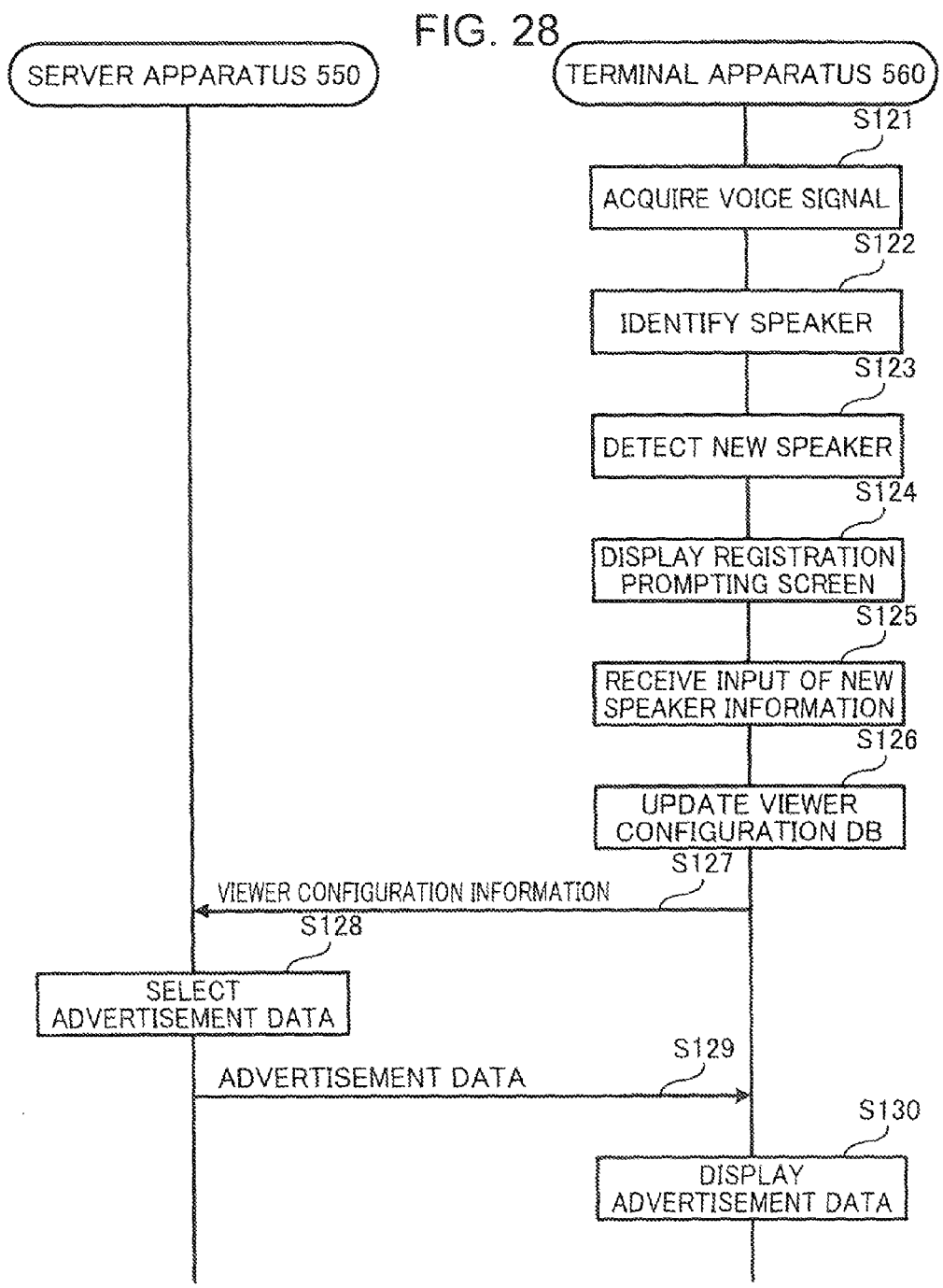
FIG. 28 is a sequence diagram showing an example of operations of the content providing system according to Embodiment 4 of the present invention.

FIG. 28 is a sequence diagram showing an example of the operations of the content providing system 800 according to Embodiment 4 of the present invention. Note that FIG. 28 illustrates a case in which a new viewer is detected by the terminal apparatus 560.

First, the voice acquisition unit 522 of the terminal apparatus 560 acquires a voice signal of a viewer of the terminal apparatus 560 (step S121). Note that step S121 corresponds to the process that is executed by the voice acquisition unit 401 of the content providing system 400 shown in FIG. 18. The voice acquisition unit 522 outputs the acquired viewer voice signal to the speaker identification unit 512.

Next, the speaker identification unit 512 identifies the speaker by means of the viewer voice signal acquired by the voice acquisition unit 522 and the viewer configuration DB 515 storing information on the viewer of the terminal apparatus 560 (step S122). Step S122 corresponds to the process that is executed by the speaker identification unit 402 of the content providing system 400 shown in FIG. 18. The viewer configuration DB 515 stores only the viewer configuration information of the viewer who uses the terminal apparatus 560. The viewer configuration information is the information having the nickname, age, gender, and voice signal associated with one another, as shown in FIG. 24.

Next, the speaker identification unit 512 detects a new speaker who is not registered in the viewer configuration DB 515 (step S123). In other words, in a case where the registered voice signals registered in the viewer configuration DB 515 include a registered voice signal that matches the received viewer voice signal, the speaker identification unit 512 determines that the speaker corresponding to the viewer voice signal is the speaker corresponding to this registered voice signal. However, in a case where the registered voice signals registered in the viewer configuration DB 515 do not include a registered voice signal that matches the received viewer voice signal, the speaker identification unit 512 determines that the speaker corresponding to the viewer voice signal is a new speaker who is not registered in the viewer configuration DB 515. A new speaker is detected in this manner.

When a new speaker who is not registered in the viewer configuration DB 515 is detected, the viewer configuration management unit 562 instructs the display unit 524 to display the registration prompting screen for prompting registration of the tag information associated with the new speaker, in the database. In so doing, the new speaker may be detected on condition that the voice signals of the new speaker are detected consecutively for a predetermined period of time (several days). Such a configuration can prevent erroneous identification of the voice of a briefly visiting guest as the voice of a fixed viewer such as a family member.

Next, the display unit 524 displays the registration prompting screen for prompting input of the tag information associated with the new speaker (step S124). Step S124 corresponds to the process that is executed by the display unit 407 of the content providing system 400 shown in FIG. 18. The registration prompting screen may be displayed at an edge of the display screen displaying the program and other contents so as not to interfere with the viewing of the contents. In addition, the registration prompting screen may be displayed when the power of the terminal apparatus 560 is turned ON/OFF so as not to interfere with the viewing of the contents.

Next, the information input unit 523 receives an input of new speaker information including the viewer voice signal and the information on the viewer (viewer tag data) associated with the viewer voice signal (step S125). The new speaker inputs the new speaker information in accordance with the display of the registration prompting screen. Step S125 corresponds to the process that is executed by the information input unit 404 of the content providing system 400 shown in FIG. 18. Note that the registration prompting screen that is displayed by the display unit 524 of the terminal apparatus 560 when the new speaker information is input has already been described in Embodiment 3 with reference to FIGS. 21 to 23. Therefore, the descriptions thereof are omitted accordingly.

After completion of the input process, the viewer configuration management unit 562 updates the viewer configuration DB 515, as in Embodiment 1, by storing the viewer tag data and viewer voice signal of the new speaker in the viewer configuration DB 515 (step S126). The data configuration of the viewer configuration DB 515 is illustrated in FIG. 24. Step S126 corresponds to the process that is executed by the viewer configuration management unit 403 of the content providing system 400 shown in FIG. 18.

Next, the terminal communication unit 561 transmits the viewer configuration information of the speaker or new speaker identified by the speaker identification unit 512, to the server apparatus 550 via the communication line 530

(step S127). The viewer configuration information transmitted to the server apparatus 550 may be all or some of the plurality of information pieces associated with the voice signal. In other words, the viewer configuration information may be any information that includes at least either the age or gender and is capable of specifying an advertisement to be provided to the speaker. In the present embodiment, the terminal communication unit 561 transmits to the server apparatus 550 the viewer configuration information that includes the age and gender of the speaker or new speaker identified by the speaker identification unit 512. The server communication unit 551 of the server apparatus 550 receives the viewer configuration information transmitted by the terminal apparatus 560.

Next, based on the received viewer configuration information, the advertisement distribution control unit 554 of the server apparatus 550 selects, from the distributed advertisement DB 516, advertisement data to be distributed to the terminal apparatus 560 (step S128). The method for selecting an advertisement is not particularly limited. For example, the distributed advertisement DB 516 stores advertisement data to be distributed, in connection with the ages and genders. For example, an advertisement for a car is associated with a male in his 40s, and an advertisement for a cosmetic product is associated with a female in her 30s. The advertisement distribution control unit 514 selects an advertisement optimal for the age and gender of each user. Step S128 corresponds to the process that is executed by the content distribution control unit 405 of the content providing system 400 shown in FIG. 18.

Next, the server communication unit 551 transmits the advertisement data selected by the advertisement distribution control unit 514 to the terminal apparatus 560 via the communication line 530 (step S129). The terminal communication unit 561 of the terminal apparatus 560 receives the advertisement data transmitted by the server apparatus 550.

Next, the display unit 524 of the terminal apparatus 560 displays the advertisement data distributed by the server apparatus 550 (step S130). Step S130 corresponds to the process that is executed by the content distribution unit 406 of the content providing system 400 shown in FIG. 18.

The above are the operations of the content providing system 800.

(Operations of the Server Apparatus)

The operations of the server apparatus 550 of the content providing system 800 according to Embodiment 4 are described next.

Figure 29:
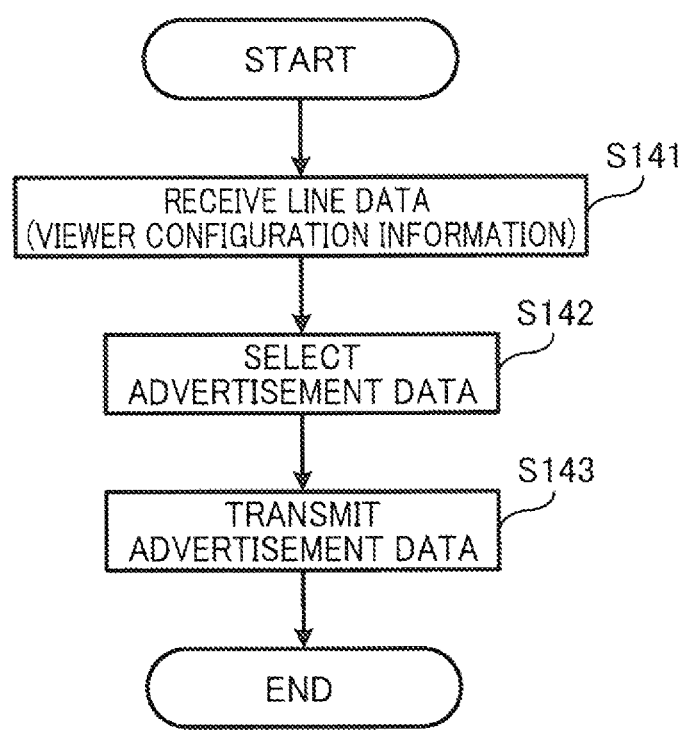
FIG. 29 is a flowchart showing an example of operations of a server apparatus according to Embodiment 4 of the present invention.

FIG. 29 is a flowchart showing an example of the operations of the server apparatus 550 according to Embodiment 4 of the present invention. The server apparatus 550 may start its operations shown in FIG. 29, for example, when its power switch or the function related thereto is turned ON and may end the operations when the power switch or the function related thereto is turned OFF.

First, in step S141, the server communication unit 551 of the server apparatus 550 receives line data by means of the communication line 530. In so doing, the server communication unit 551 acquires the viewer configuration information transmitted by the terminal apparatus 560 and outputs the viewer configuration information to the advertisement distribution control unit 554.

In the next step S142, based on the viewer tag data representing the age and gender, which is included in the acquired viewer configuration information, the advertisement distribution control unit 554 selects advertisement data from the distributed advertisement DB 516, and outputs the selected advertisement data to the server communication unit 551.

In the next step S143, the server communication unit 551 transmits the advertisement data selected by the advertisement distribution control unit 514 to the terminal apparatus 560 through the communication line 530.

The above are the operations of the server apparatus 550.

(Operations of the Terminal Apparatus)

The operations of the terminal apparatus 560 of the content providing system 800 according to Embodiment 4 are described next.

Figure 30:
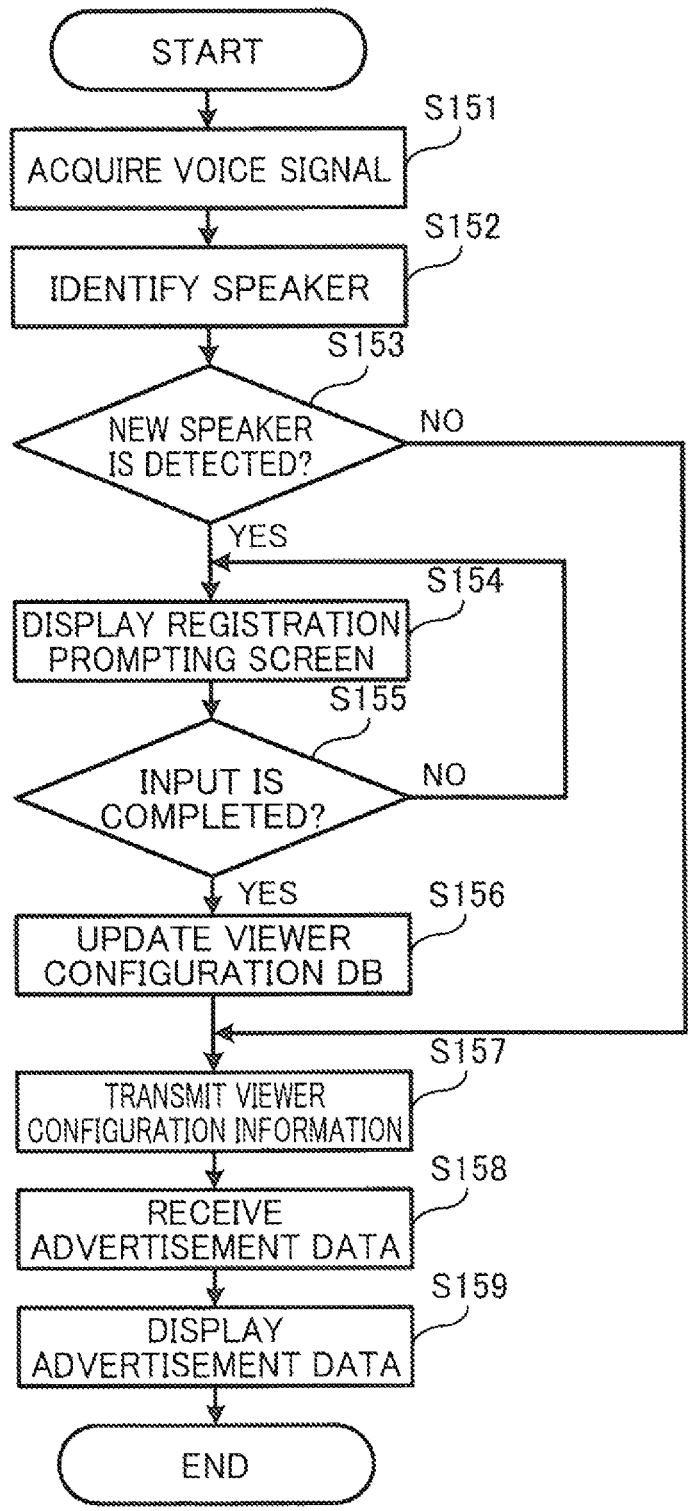
FIG. 30 is a flowchart showing an example of operations of a terminal apparatus according to Embodiment 4 of the present invention.

FIG. 30 is a flowchart showing an example of the operations of the terminal apparatus 560 according to Embodiment 4 of the present invention. The terminal apparatus 560 may start its operations shown in FIG. 30, for example, when its power switch or the function related thereto is turned ON and may end the operations when the power switch or the function related thereto is turned OFF.

First, in step S151, the voice acquisition unit 522 acquires a viewer voice signal representing a vocal sound made by a viewer in the vicinity of the terminal apparatus 520. The voice acquisition unit 522 outputs the acquired viewer voice signal to the speaker identification unit 512.

In the next step S152, the speaker identification unit 512 identifies the speaker corresponding to the acquired viewer voice signal. The speaker identification unit 512 identifies the speaker by collating the acquired viewer voice signal with the viewer configuration DB 515.

In the next step S153, the speaker identification unit 512 uses the result of speaker identification to determine whether a new speaker is detected or not. In a case where the received viewer voice signal is not registered in the viewer configuration DB 515, the speaker identification unit 512 determines that a new speaker is detected. In a case where the received viewer voice signal is registered in the viewer configuration DB 515, the speaker identification unit 512 determines that a new speaker is not detected. Note that a new speaker may be detected on condition that the new speaker to be detected is a speaker who is absent from the viewer configuration DB 515 over a predetermined period of time (several days). Such a configuration can prevent erroneous identification of the voice of a briefly visiting guest as the voice of a fixed viewer such as a family member. In a case where it is determined that a new speaker is detected (YES in step S153), the process proceeds to step S154. In a case where it is determined that a new speaker is not detected (NO in step S153), the process proceeds to step S157.

Subsequently, in step S154, the display unit 524 displays the registration prompting screen for prompting input of the information on the new speaker. The information input unit 523 here receives the input of the viewer voice signal of the new speaker and the viewer tag data associated with the viewer voice signal of the new speaker.

In the next step S155, the viewer configuration management unit 562 determines whether or not the input of the viewer voice signal of the new speaker and the viewer tag data associated with the viewer voice signal of the new speaker is completed. In a case where it is determined that the input is not yet completed (NO in step S155), the process returns to step S154 in which the display unit 524 continues to display the registration prompting screen. However, in a case where it is determined that the input is completed (YES in step S155), the process proceeds to step S156.

Next, in step S156, the viewer configuration management unit 562 updates the viewer configuration DB 515. Specifically, the viewer configuration management unit 562 updates the viewer configuration DB 515 by using the viewer tag data input by the information input unit 523 and the viewer voice signal acquired by the voice acquisition unit 522. As shown in FIG. 24, the viewer configuration DB 515 is updated by having the ages, genders and viewer voice signals associated with the nicknames of new speakers.

In the next step S157, the viewer configuration management unit 562 outputs the viewer configuration information to the terminal communication unit 561, and the terminal communication unit 561 transmits the viewer configuration information to the server apparatus 550 via the communication line 530.

Next, in step S158, the terminal communication unit 561 receives the advertisement data transmitted by the server apparatus 550.

In step S159 thereafter, the display unit 524 displays the advertisement data received by the terminal communication unit 561.

The above are the operations of the terminal apparatus 560.

Since the terminal apparatus identifies a speaker and manages the information on the speaker through the operations described above, the data transmitted by the terminal apparatus can be narrowed down to the information on the speaker that is required to select the advertisement data. Therefore, the present embodiment can provide a content providing system that can distribute an advertisement suitable for a viewer even when the communication line has a low capacity.

In Embodiments 3 and 4, the viewer configuration DB may not only have nicknames, ages, genders and voice signals associated with one another, but also have information indicating a family relation associated with these items. The information indicating a family relation is information on whether a viewer is, for example, the father, the mother, or a child. In this case, the distributed advertisement DB may store a family structure and advertisement data associated with each other, and the content distribution control unit 405 may acquire information indicating the family structure of a viewer and select the advertisement data corresponding to the acquired family structure from the distributed advertisement DB. The information indicating a family structure is information indicating that, for example, the family of a viewer consists of a father, a mother, and a child.

Therefore, the advertisement data suitable for the family structure within a household can be distributed.

Moreover, in Embodiments 3 and 4, the viewer configuration DB may not only have nicknames, ages, genders and voice signals associated with one another, but also have information indicating a family relation and information on a program viewed by a viewer associated with these items. The information indicating a family relation is information on whether a viewer is, for example, the father, the mother, or a child. The information on a program is information indicating, for example, the name, channel number, broadcasting date/time, and cast members of a television program viewed using the terminal apparatus. In this case, the content distribution control unit 405 may acquire information indicating the family structure of a viewer, acquire information on a program of another viewer belonging to the same family structure as the acquired family structure, and provide the program viewed by the latter viewer to the identified speaker.

In this manner, a program viewed by another viewer belonging to the same family structure can be provided to the identified speaker.

The present embodiment provides advertisement data to the terminal apparatus, but the present invention is not particularly limited to this embodiment, and program data may be provided to the terminal apparatus.

INDUSTRIAL APPLICABILITY

The speaker identification method, speaker identification apparatus and information management method according to the present invention are helpful as a speaker identification method, a speaker identification apparatus, and an information management method which are capable of constructing and updating a database without causing a speaker to execute a troublesome setting operation, and identifying a speaker in the vicinity of a device displaying a content.

The speaker identification method, speaker identification apparatus and information management method according to the present invention are helpful as a speaker identification method, a speaker identification apparatus, and an information management method, which are capable of registering a new speaker in the database without causing a speaker to execute a troublesome setting operation, and identifying a speaker.

The invention claimed is:

1. A speaker identification method for identifying a speaker in the vicinity of a device displaying a content, the method comprising the steps of:
   displaying a content on the device;
   acquiring voice information of the speaker during display of the content on the device;
   determining whether or not the speaker corresponding to the acquired voice information matches a speaker corresponding to registered voice information stored in a voice database in connection with content information on a content, the content information including a name of a cast member appearing in the content, and the registered voice information being voice information of a member belonging to a predetermined group;
   in a case where it is determined that the speaker corresponding to the acquired voice information matches the speaker corresponding to the registered voice information stored in the voice database, acquiring the content information on the content displayed on the device from a content database for storing information to identify the content, and the content information in connection with each other at the time of acquisition of the voice information, and storing the acquired content information in connection with the registered voice information;
   in a case where it is determined that the speaker corresponding to the acquired voice information does not match the speaker corresponding to the registered voice information stored in the voice database, compiling the acquired voice information in an internal memory which is different from the voice database without updating the voice database at the time of the determining;
   identifying a speaker of a plurality of pieces of voice information compiled in the internal memory for a predetermined period of time, and extracting, among the plurality of pieces of voice information, two or more pieces of voice information identified as corresponding to a same speaker;
   counting the number of the extracted pieces of voice information by the same speaker, and storing one among the extracted pieces of voice information in the voice database as registered voice information of a new member belonging to the predetermined group in a case where the counted number indicates a predetermined number or more; and in a case where it is determined that the speaker corresponding to the acquired voice information matches the speaker corresponding to the registered voice information stored in the voice database, extracting the name of the cast member from the content information linked to the speaker corresponding to the acquired voice information, and referencing a service database in which names of cast members are stored in connection with services to be provided to speakers, thereby specifying a service associated with the name of the cast member as a candidate for a service to be provided.

2. The speaker identification method according to claim 1, wherein the content information includes a name of the content and a name of a person associated with the content.

3. The speaker identification method according to claim 1, further comprising the step of classifying a plurality of contents associated with the registered voice information into a plurality of genres, calculating, for each of the plurality of genres, a percentage of contents classified into each of the genres from among the plurality of contents, and storing the percentage of contents calculated for each of the plurality of genres in the voice database in connection with the registered voice information.

4. The speaker identification method according to claim 1, wherein the voice database stores content information in connection with a service to be provided to a speaker who views a content corresponding to the content information, and the method further comprises the step of, in a case where it is determined that the speaker corresponding to the acquired voice information matches the speaker corresponding to the registered voice information stored in the voice database, specifying the content information stored in connection with the registered voice information, specifying a service associated with the specified content information, and providing the specified service to the speaker.

5. The speaker identification method according to claim 4, further comprising the steps of:

determining whether at least one available service exists or not and whether or not the at least one available service is provided at a predetermined service providing timing; and in a case where it is determined that the at least one available service exists and that the at least one available service is provided at the predetermined service providing timing, displaying candidates for the at least one available service on the device.

6. The speaker identification method according to claim 5, further comprising the steps of:

providing the speaker with a service that is selected by the speaker from among the displayed candidates for the at least one available service; and storing the provided service in the voice database in connection with the registered voice information.

7. The speaker identification method according to claim 4, wherein the service includes a service for distributing a content to be displayed on the device, or a service for distributing an advertisement to be displayed on the device.

8. The speaker identification method according to claim 1, wherein, in a case where partial voice information of the registered voice information registered in the voice database is not acquired for a predetermined period of time or longer, the partial voice information and/or information associated with the partial voice information is deleted from the voice database.

9. The speaker identification method according to claim 1, wherein whether or not the speaker corresponding to the acquired voice information matches the speaker corresponding to the registered voice information stored in the voice database in connection with the content information on the content is determined by extracting text information from the acquired voice information and analyzing spoken words based on the extracted text information.

10. The speaker identification method according to claim 5, wherein the device includes a television, and the service providing timing is a timing at which an operation for displaying a program guide for the television is executed.

11. A speaker identification apparatus for identifying a speaker, comprising:

a display unit that displays a content;

a voice acquisition unit that acquires voice information of a speaker in the vicinity of the speaker identification apparatus during display of the content on the display unit;

a voice database for storing registered voice information in connection with content information on a content, the content information including a name of a cast member appearing in the content, and the registered voice information being voice information of a member belonging to a predetermined group;

a content database for storing information to identify the content, and the content information in connection with each other;

a determination unit that determines whether or not the speaker corresponding to the voice information acquired by the voice acquisition unit matches a speaker corresponding to the registered voice information stored in the voice database in connection with the content information;

a database update unit that acquires the content information on the content displayed on the display unit from the content database at the time of acquisition of the voice information and stores the acquired content information in connection with the registered voice information, in a case where the determination unit determines that the speaker corresponding to the acquired voice information matches the speaker corresponding to the registered voice information stored in the voice database;

a compilation unit that compiles the acquired voice information in an internal memory which is different from the voice database in a case where the determination unit determines that the speaker corresponding to the acquired voice information does not match the speaker corresponding to the registered voice information stored in the voice database, without updating the voice database at the time of the determination by the determining unit;

an extraction unit that identifies a speaker of a plurality of pieces of voice information compiled in the memory for a predetermined of time, and extracts, among the plurality of pieces of voice information, two or more pieces of voice information identified as corresponding to a same speaker;

a database storage unit that counts the number of the extracted pieces of voice information by the same speaker, and stores one among the extracted pieces of voice information in the voice database as registered voice information of a new member belonging to the predetermined group in a case where the counted number indicates a predetermined number or more; and a specification unit that extracts the name of the cast member from the content information linked to the speaker corresponding to the acquired voice information, and references a service database in which names of cast members are stored in connection with services to be provided to speakers, thereby specifying a service associated with the name of the cast member as a candidate for a service to be provided.

12. An information management method of a speaker identification system for identifying a speaker in the vicinity of a device displaying a content, the method comprising the steps of:

displaying a content on the device;

receiving voice information of the speaker, the voice information being acquired during display of the content on the device;

determining whether or not the speaker corresponding to the received voice information matches a speaker corresponding to registered voice information stored in a voice database in connection with content information on a content, the content information including a name of a cast member appearing in the content, and the registered voice information being voice information of a member belonging to a predetermined group;

in a case where it is determined that the speaker corresponding to the received voice information matches the speaker corresponding to the registered voice information stored in the voice database, acquiring the content information on the content displayed on the device from a content database for storing information to identify the content, and the content information in connection with each other at the time of acquisition of the voice information, and storing the received content information in connection with the registered voice information;

in a case where it is determined that the speaker corresponding to the received voice information does not match the speaker corresponding to the registered voice information stored in the voice database, compiling the acquired voice information in an internal memory which is different from the voice database without updating the voice database at the time of the determining;

identifying a speaker of a plurality of pieces of voice information compiled in the memory for a predetermined period of time, and extracting, among the plurality of pieces of information, two or more pieces of voice information identified as corresponding to a same speaker;

counting the number of the extracted pieces of voice information by the same speaker, and storing one among the extracted pieces of voice information in the voice database as registered voice information of a new member belonging to the predetermined group in a case where the counted number indicates a predetermined number or more; and in a case where it is determined that the speaker corresponding to the acquired voice information matches the speaker corresponding to the registered voice information stored in the voice database, extracting the name of the cast member from the content information linked to the speaker corresponding to the acquired voice information, and referencing a service database in which names of cast members are stored in connection with services to be provided to speakers, thereby specifying a service associated with the name of the cast member as a candidate for a service to be provided.

* * * * *